United States Patent
Nakagawa et al.

(10) Patent No.: US 8,393,798 B2
(45) Date of Patent: Mar. 12, 2013

(54) BEARING DEVICE FOR A WHEEL

(75) Inventors: Tohru Nakagawa, Iwata (JP); Yuichi Asano, Iwata (JP); Kiyoshige Yamauchi, Iwata (JP); Masahiro Ozawa, Iwata (JP)

(73) Assignee: NTN Corporation, Osaka (JP)

( * ) Notice: Subject to any disclaimer, the term of this patent is extended or adjusted under 35 U.S.C. 154(b) by 582 days.

(21) Appl. No.: 12/602,237

(22) PCT Filed: May 27, 2008

(86) PCT No.: PCT/JP2008/059723
§ 371 (c)(1),
(2), (4) Date: Nov. 30, 2009

(87) PCT Pub. No.: WO2008/149728
PCT Pub. Date: Dec. 11, 2008

(65) Prior Publication Data
US 2010/0195947 A1    Aug. 5, 2010

(30) Foreign Application Priority Data
Jun. 1, 2007   (JP) ................................. 2007-147117

(51) Int. Cl.
*F16C 13/00*    (2006.01)
(52) U.S. Cl. ....................................... 384/544; 384/589
(58) Field of Classification Search .... 403/359.1–359.6; 464/178, 182, 906; 384/544, 589
See application file for complete search history.

(56) References Cited

U.S. PATENT DOCUMENTS

| | | | |
|---|---|---|---|
| 6,497,515 B1 * | 12/2002 | Sahashi et al. | ............ 384/544 |
| 2001/0016520 A1 | 8/2001 | Sahashi et al. | |
| 2003/0012474 A1 | 1/2003 | Tajima et al. | |
| 2004/0234182 A1 | 11/2004 | Tajima et al. | |

FOREIGN PATENT DOCUMENTS

| | | |
|---|---|---|
| JP | 08-226426 | 9/1996 |
| JP | 2001-171306 | 6/2001 |

(Continued)

OTHER PUBLICATIONS

International Preliminary Report on Patentability and Written Opinion of the International Searching Authority issued Dec. 17, 2009 in International (PCT) Application No. PCT/JP2008/059723 of which the present application is the U.S. National Stage.

(Continued)

*Primary Examiner* — Phillip A Johnson
(74) *Attorney, Agent, or Firm* — Wenderoth, Lind & Ponack, L.L.P.

(57) ABSTRACT

A bearing device for a wheel has minimized circumferential play and allows a hub ring and an outer joint member of a constant velocity universal joint to be connected with excellent workability. Axially extending projections are formed on either one of the outer diameter surface of a shaft of the outer joint member and the inner diameter surface of a hole of the hub ring, and the projections are axially press fitted into the other. Recesses fitted in an intimate contact manner onto the projections are formed in the other. Thus, a recess/projection fitting structure is formed. In the structure, the entire fitting/contact portions of the projections and the recesses are in intimate contact with each other. Further, a shaft come-out prevention structure is provided between the shaft of the outer joint member and the inner diameter surface of the hub ring.

20 Claims, 20 Drawing Sheets

FOREIGN PATENT DOCUMENTS

| | | |
|---|---|---|
| JP | 2001-294011 | 10/2001 |
| JP | 2001-334806 | 12/2001 |
| JP | 2002-356101 | 12/2002 |
| JP | 2003-65347 | 3/2003 |
| JP | 2004-256039 | 9/2004 |
| JP | 2004-340311 | 12/2004 |
| JP | 2005-041311 | 2/2005 |
| JP | 2005-193757 | 7/2005 |

OTHER PUBLICATIONS

International Search Report issued Sep. 2, 2008 in International (PCT) Application No. PCT/JP2008/059723.

Japanese Office Action issued Jan. 10, 2013 in corresponding Japanese Patent Application No. 2007-147117 with partial English translation.

* cited by examiner

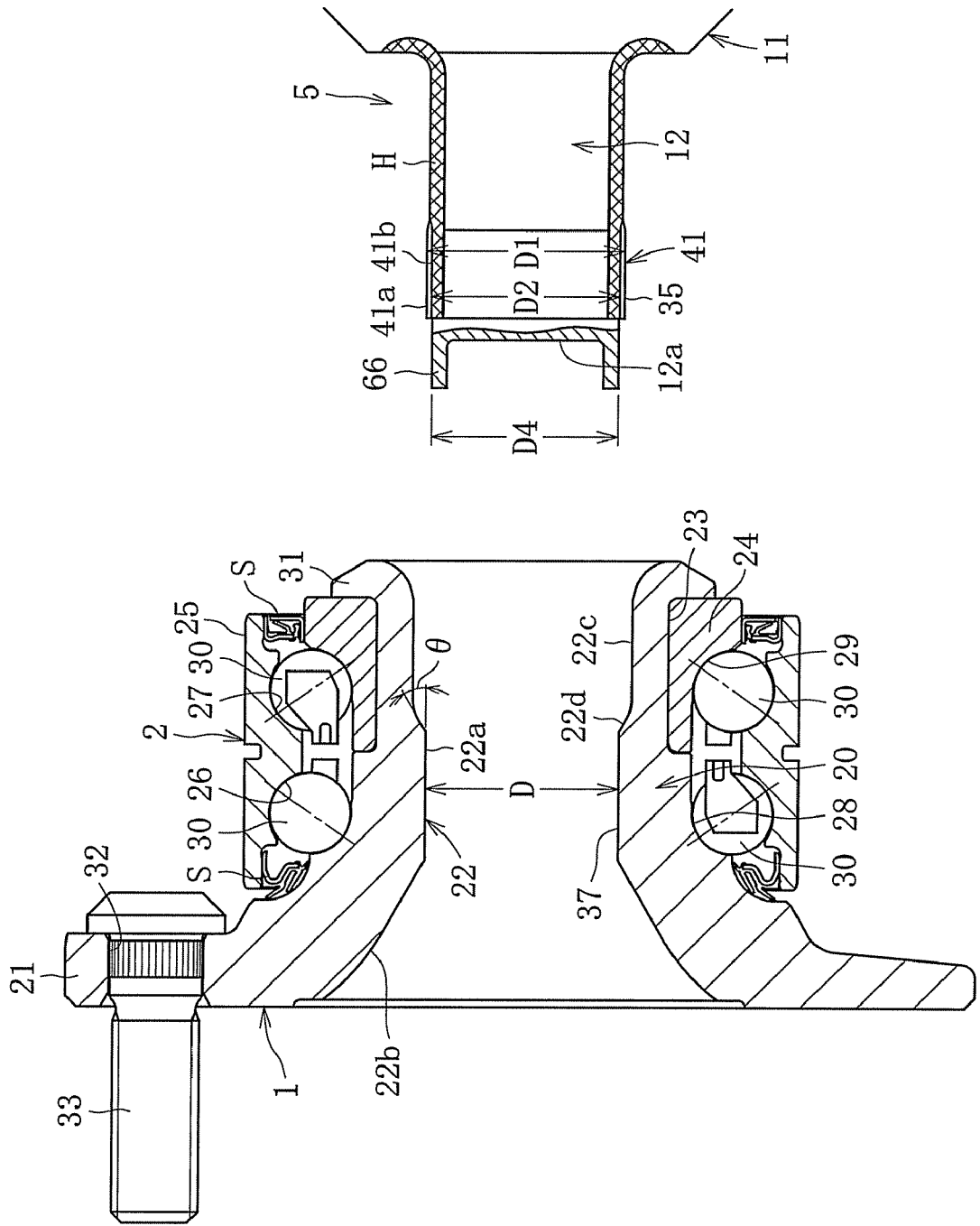

BEARING DEVICE FOR A WHEEL

TECHNICAL FIELD

The present invention relates to a bearing device for a wheel for rotatably supporting the wheel relative to a vehicle body in a vehicle such as a motor vehicle or the like.

BACKGROUND ART

The bearing device for the wheel has been evolved from what is called a first generation structure, which singly uses a double row roller bearing, to a second generation which integrally has a vehicle body attaching flange with an outer member, and has been further developed to a third generation in which one inner raceway surface of the double row roller bearing is integrally formed on an outer circumference of a hub wheel integrally having a wheel attaching flange, and moreover to a fourth generation in which a constant velocity universal joint is integrated into a hub wheel, and the other inner raceway surface of the double row roller bearing is integrally formed on an outer circumference of an outer joint member constructing the constant velocity universal joint.

For example, a structure called the third generation is described in patent document 1. As shown in FIG. 21, the bearing device for the wheel called the third generation is provided with a hub wheel 152 having a flange 151 extending in an outer diameter direction, a constant velocity universal joint 154 having an outer joint member 153 fixed to the hub wheel 152, and an outer member 155 arranged in an outer peripheral side of the hub wheel 152.

The constant velocity universal joint 154 is provided with the outer joint member 153, an inner joint member 158 arranged within a bowl-shaped portion 157 of the outer joint member 153, a ball 159 arranged between the inner joint member 158 and the outer joint member 153, and a cage 160 retaining the ball 159. Further, a spline portion 161 is formed on an inner circumferential surface of a center hole of the inner joint member 158, an end portion spline portion of a shaft (not shown) is inserted to the center hole, and the spline portion 161 at the inner joint member 158 is engaged with the spline portion at the shaft.

Further, the hub wheel 152 has a tubular shaft portion 163 and the flange 151, and an outer end surface 164 (an end surface on the opposite joint side) of the flange 151 is provided in a protruding manner with a short tubular pilot portion 165 to which a wheel and a brake rotor, not shown, are installed. The pilot portion 165 is constructed by a large diameter first portion 165a and a small diameter second portion 165b, the brake rotor is externally fitted to the first portion 165a, and the wheel is externally fitted to the second portion 165b.

Further, a notch portion 166 is provided on an outer circumferential surface of an end portion at the bowl-shaped portion 157 of the shaft portion 163, and an inner joint member 167 is fitted to the notch portion 166. A first inner raceway surface 168 is provided in the vicinity of the flange of an outer circumferential surface of the shaft portion 163 of the hub wheel 152, and a second inner raceway surface 169 is provided on an outer circumferential surface of the inner joint member 167. Further, a bolt mounting hole 162 is provided on the flange 151 of the hub wheel 152, and a hub bolt for fixing the wheel and the brake rotor to the flange 151 is mounted to the bolt mounting hole 162.

The outer member 155 is provided with two rows of outer raceway surfaces 170 and 171 on its inner circumference, and is provided with the flange (the vehicle body attaching flange) 151 on its outer circumference. Further, the first outer raceway surface 170 of the outer member 155 is opposed to the first inner raceway surface 168 of the hub wheel 152, the second outer raceway surface 171 of the outer member 155 is opposed to the raceway surface 169 of the inner joint member 167, and a rolling element 172 is interposed between the foregoing.

A shaft portion 173 of the outer joint member 153 is inserted to the shaft portion 163 of the hub wheel 152. In the shaft portion 173, a thread portion 174 is formed in an end portion of an opposite bowl-shaped portion, and a spline portion 175 is formed between the thread portion 174 and the bowl-shaped portion 157. Further, a spline portion 176 is formed on an inner circumferential surface (an inner surface) of the shaft portion 163 of the hub wheel 152, and when the shaft portion 173 is inserted to the shaft portion 163 of the hub wheel 152, the spline portion 175 at the shaft portion 173 is engaged with the spline portion 176 at the hub wheel 152.

Further, a nut member 177 is screwed to the thread portion 174 of the shaft portion 173 protruding from the shaft portion 163, and the hub wheel 152 and the outer joint member 153 are coupled to each other. At this time, an inner end surface (a back surface) 178 of the nut member 177 comes into contact with an outer end surface 179 of the shaft portion 163, and an end surface 180 at the shaft portion of the bowl-shaped portion 157 comes into contact with an outer end surface 181 of the inner joint member 167. In other words, by fastening the nut member 177, the hub wheel 152 is pinched by the nut member 177 and the bowl-shaped portion 157 via the inner joint member 167.

Patent Document 1: Japanese Unexamined Patent Publication No. 2004-340311

SUMMARY OF THE INVENTION

Problem to be Solved by the Invention

Conventionally, as described above, the spline portion 175 at the shaft portion 173 is engaged with the spline portion 176 at the hub wheel 152. Accordingly, it is necessary to apply carry out spline working to both the shaft portion 173 side and the hub wheel 152 side, resulting in an increase in cost. In addition, it is necessary to align concavity and convexity between the spline portion 175 at the shaft portion 173 and the spline portion 176 at the hub wheel 152 at a time of press-fitting, and there is a risk that concave and convex teeth are damaged (torn) if they are press-fitted by aligning the teeth surfaces. Further, if they are press-fitted by aligning large diameters of the concave and convex teeth, without aligning the teeth surfaces, a play in a circumferential direction tends to be generated. As described above, if the play in the circumferential direction exists, there is a risk that an abnormal noise is generated as well as deterioration of a transmissibility of a rotation torque. Accordingly, in the case of the spline fitting as the conventional manner, it is hard to realize both the damage of the concave and convex teeth and the play in the circumferential direction.

Further, it is necessary to screw the nut member 177 to the thread portion 174 of the shaft portion 173 protruding from the tube portion 163. This necessitates thread fastening working at a time of assembly, resulting in deteriorated workability, and increases the number of parts, resulting in deteriorated parts manageability.

The present invention is made by taking the problems mentioned above into consideration, and provides a bearing device for a wheel which is capable of suppressing a play in a circumferential direction and is excellent in coupling workability between a hub wheel and an outer joint member of a constant velocity universal joint.

Means for Solving the Problem

In accordance with the present invention, there is provided a bearing device for a wheel, including: a roller bearing having an outer member having on an inner circumference thereof double row raceway surfaces; an inner member having on an outer circumference thereof double row raceway surfaces; and double row rolling elements interposed between the raceway surfaces of the outer member and the raceway surfaces of the inner member, the inner member including on an outer surface thereof a hub wheel having a wheel attaching flange, the hub wheel being integrated with, via a convex and concave fitting structure, a shaft portion of an outer joint member of a constant velocity universal joint fitted and inserted to a hole portion of the hub wheel, wherein a convex portion extending in an axial direction and provided on one of an outer diameter surface of the shaft portion of the outer joint member of the constant velocity universal joint and an inner diameter surface of the hole portion of the hub wheel is press-fitted to the other along the axial direction, and a concave portion intimately attached and fitted to the convex portion is formed on the other by the convex portion, thereby configuring a convex and concave fitting structure where an entire area of fitting and contact between the convex portion and the concave portion is in an intimate contact state, while providing a shaft portion come-off preventing structure between the shaft portion of the outer joint member and the inner surface of the hub wheel.

In accordance with the bearing device for the wheel of the present invention, since the shaft portion of the outer joint member of the constant velocity universal joint fitted and inserted to the hole portion of the hub wheel is integrated to the hub wheel via the concave and convex fitting structure where the entire area of fitting and contact between the convex portion and the concave portion is in an intimate contact state, there is no gap in which a play is generated in the diametrical direction and the circumferential direction in the fitting structure. Further, the concave portion intimately attached and fitted to the convex portion is formed on the inner diameter surface of the hole portion by the convex portion by press-fitting the convex portion which extends in the axial direction and is provided in one of the outer diameter surface of the shaft portion of the outer joint member and the inner diameter surface of the hole portion of the hub wheel to the other along the axial direction, thereby configuring the concave and convex fitting structure. In other words, the shape of the convex portion is transcribed to the concave portion forming surface on the other side. At this time, the convex portion cuts into the concave portion forming surface on the other side, thereby forming a state in which the hole portion is slightly enlarged in diameter, and allowing the movement of the convex portion in the axial direction. When the movement in the axial direction stops, the hole portion attempts to return to its original diameter, thus reducing in diameter. Accordingly, the entire area of fitting and contact between the convex portion and the concave portion is in an intimate contact state.

Since the shaft portion come-off preventing structure is provided between the shaft portion of the outer joint member and the inner surface of the hub wheel, it is possible to effectively prevent the shaft portion of the outer joint member from coming off from the hole portion of the hub wheel in the axial direction.

The concave portion intimately attached and fitted to the convex portion may be formed on the inner diameter surface of the hole portion of the hub wheel by the convex portion by providing the convex portion of the concave and convex fitting structure on the shaft portion of the outer joint member of the constant velocity universal joint, making a hardness of at least an end portion in the axial direction of the convex portion higher than the inner diameter portion of the hole portion of the hub wheel, and press-fitting the shaft portion to the hole portion of the hub wheel from the end portion side in the axial direction of the convex portion, thereby configuring the concave and convex fitting structure. Further, the concave portion intimately attached and fitted to the convex portion may be formed on the outer diameter surface of the shaft portion of the outer joint member by the convex portion by providing the convex portion of the concave and convex fitting structure on the inner diameter surface of the hole portion of the hub wheel, making a hardness of at least the end portion in the axial direction the convex portion higher than the outer diameter portion of the shaft portion of the outer joint member of the constant velocity universal joint, and press-fitting the convex portion at the hub wheel to the shaft portion of the outer joint member from the end portion side in the axial direction, thereby configuring the concave and convex fitting structure.

It is preferable that an intermediate position in a protruding direction of the convex portion provided in one of the outer diameter surface of the shaft portion of the outer joint member and the inner diameter surface of the hole portion of the hub wheel corresponds to a position of the concave portion forming surface of the other before formation of the concave portion. At this time, there is a case that an inner diameter dimension of the hole portion of the hub wheel is made smaller than a maximum diameter dimension of a circular arc connecting apexes of a plurality of the convex portions provided on an outer diameter of the shaft portion of the outer joint member, and larger than a maximum diameter dimension of a circular arc connecting roots between the convex portions of the shaft portion. Further, there is a case that an outer diameter dimension of the shaft portion of the outer joint member is made larger than a minimum diameter dimension of a circular arc connecting apexes of a plurality of the convex portions provided on the hole portion of the hub wheel and protruding inward in a radial direction, and smaller than a minimum diameter dimension of a circular arc connecting roots between the convex portions of the hole portion of the hub wheel.

There is a case that the hole portion of the hub wheel is provided with a shaft portion fitting hole in which the concave and convex fitting structure is formed, and a taper hole which is expanded from an end portion in an opposite joint side of the fitting hole of the shaft portion toward the opposite joint side, and the shaft portion come-off preventing structure is constructed by a taper-shaped locking piece which extends from the shaft portion of the outer joint member and locks to the taper hole. Further, there is a case that the hole portion of the hub wheel is provided with a shaft portion fitting hole in which the concave and convex fitting structure is formed, and a stepped surface which extends to an outer diameter side from an end portion in an opposite joint side of the shaft portion fitting hole, and the shaft portion come-off preventing structure is constructed by an outer collar-shaped locking piece which extends in an outer diameter direction from the shaft portion of the outer joint member and locks to the stepped surface.

The taper-shaped locking piece may be constructed by expanding a part of the shaft portion of the outer joint member in a state in which the press-fit of the shaft portion of the outer joint member to the hole portion of the hub wheel is finished, or may be constructed by expanding a short cylinder portion for aligning provided in the end portion of the shaft portion of the outer joint member. Further, the outer collar-shaped locking piece is constructed by being caulked in such a manner that a part of the shaft portion of the outer joint member protrudes to the outer diameter side in a state in which the press-fit of the shaft portion of the outer joint member to the hole portion of the hub wheel is finished.

It is preferable to provide a pocket portion storing a protruding portion which is generated by forming the concave portion during the press-fit. In this case, the protruding portion refers to a volume of material of the concave portion to which the concave portion fitting position of the convex portion is fitted, and is constructed by a volume of material that is pushed out from the concave portion to be formed, cut for forming the concave portion, or both pushed out and cut.

Further, an intermediate position in a protruding direction of the convex portion provided on any one of the outer surface of the shaft portion of the outer joint member and the inner surface of the hole portion of the hub wheel corresponds to a position of the concave portion forming surface of the other before formation of the concave portion. In other words, a part of the convex portion securely cuts into the concave portion forming surface.

It is preferable that a thickness in a circumferential direction of the intermediate position in the protruding direction of the convex portion is made smaller than a dimension in the circumferential direction at a position corresponding to the intermediate position between adjacent convex portions in the circumferential direction. By setting in this manner, it is possible that a total of the thicknesses in the circumferential direction of the intermediate positions in the protruding direction of the convex portions is made smaller than a total of the thicknesses in the circumferential direction at positions corresponding to the intermediate positions in the protruding direction in peak portions in the other side fitted between adjacent convex portions in the circumferential direction.

Effect of the Invention

In the present invention, since there is no gap to generate a play in the diametrical direction and the circumferential direction in the concave and convex fitting structure, all the fitting positions contribute to rotational torque transmission, it is possible to stably transmit the torque, and no abnormal noise is generated. Further, since an intimate attachment is secured without gaps, a strength of the torque transmitting position is improved. Accordingly, it is possible to make the bearing device for the wheel light in weight and compact.

By the shaft portion come-off preventing structure, it is possible to effectively prevent the shaft portion of the outer joint member from coming off in the axial direction from the hole portion of the hub wheel. Accordingly, it is possible to maintain a stable coupling state, and it is possible to achieve high quality of the bearing device for the wheel.

It is possible to form the concave portion intimately attached and fitted to the convex portion by press-fitting the convex portion which is provided on any one of the outer surface of the shaft portion of the outer joint member and the inner surface of the hole portion of the hub wheel to the other along the axial direction. Accordingly, it is possible to securely form the concave and convex fitting structure. Further, it is not necessary to form the spline portion or the like on the member on which the concave portion is to be formed, excellent productivity is obtained, there is no need for phase alignment between splines, it is possible to achieve an improvement of assembly efficiency, it is possible to avoid damage to the teeth surfaces at a time of press-fitting, and a stable fitted state can be maintained.

Further, in the case that the convex portion of the concave and convex fitting structure is provided on the shaft portion of the outer joint member of the constant velocity universal joint and that the hardness of the end portion in the axial direction of the convex portion is made higher than the inner diameter portion of the hole portion of the hub wheel, when the shaft portion is press-fitted to the hole portion of the hub wheel from the end portion side in the axial direction of the convex portion, it is possible to make the hardness of the shaft portion side high, and it is possible to improve the rigidity of the shaft portion. Further, in the case that the convex portion of the concave and convex fitting structure is provided in the inner surface of the hole portion of the hub wheel and that the hardness of the end portion in the axial direction of the convex portion is made higher than the outer diameter portion of the shaft portion of the outer joint member of the constant velocity universal joint, when the convex portion in the hub wheel side is press-fitted to the shaft portion of the outer joint member from the end portion side in the axial direction, it is not necessary to carry out hardening treatment (heat treatment) of the shaft portion side, resulting in excellent productivity of the outer joint member of the constant velocity universal joint.

In the case that the shaft portion come-off preventing structure is constructed by the taper-shaped locking piece or the outer collar-shaped locking piece, it is possible to omit the conventional thread fastening. This eliminates the need for forming a thread portion protruding from the hole portion of the hub wheel on the shaft portion, resulting in a reduction in weight, and omits thread fastening work, resulting in improved assembling workability. Further, since it is sufficient to expand a part of the shaft portion of the outer joint member in the case of the taper-shaped locking piece, while it is sufficient to caulk a part of the shaft portion of the outer joint member in the case of the outer collar-shaped locking piece, it is possible to easily form the shaft portion come-off preventing structure. In the case that the short cylinder portion for alignment in which the taper-shaped locking piece is provided in the end portion of the shaft portion of the outer joint member is expanded, it is possible to press-fit the shaft portion to the hub wheel while preventing axis displacement, resulting in more stable press-fit.

Providing the pocket portion for storing the protruding portion generated by forming the concave portion during the press-fit enables the protruding portion to be held (maintained) within the pocket portion, thereby preventing the protruding portion from entering into the vehicle outside the device. In other words, it is possible to keep the protruding portion being stored in the pocket portion, which eliminates the need for the removal processing of the protruding portion and thus reduces the number of assembly work steps, resulting in improved assembling workability and a reduction in cost.

Further, since the intermediate position in the protruding direction of the convex portion is arranged on the concave portion forming surface before formation of the concave portion, the convex portion cuts into the concave portion forming surface at a time of press-fitting, and it is possible to securely form the concave portion.

It is possible to enlarge the thickness in the circumferential direction of the intermediate position in the protruding direction of the peak portion in the other side in which the concave portion is formed by making the thickness in the circumferential direction of the intermediate position in the protruding direction of the convex portion smaller than a dimension at the position corresponding to the intermediate position in the protruding direction between the adjacent convex portions in the circumferential direction. Accordingly, it is possible to enlarge a shear plane area of the peak portion of the other side which is low in hardness, and it is possible to secure a torsional strength. Further, since the tooth thickness of the convex portion having high hardness is small, it is possible to make the press-fit load small, resulting in an improved press-fit characteristic.

BRIEF DESCRIPTION OF THE DRAWINGS

FIG. 3 is a cross sectional view before assembly of the bearing device for the wheel;

DESCRIPTION OF REFERENCE NUMERALS

Figure 1:
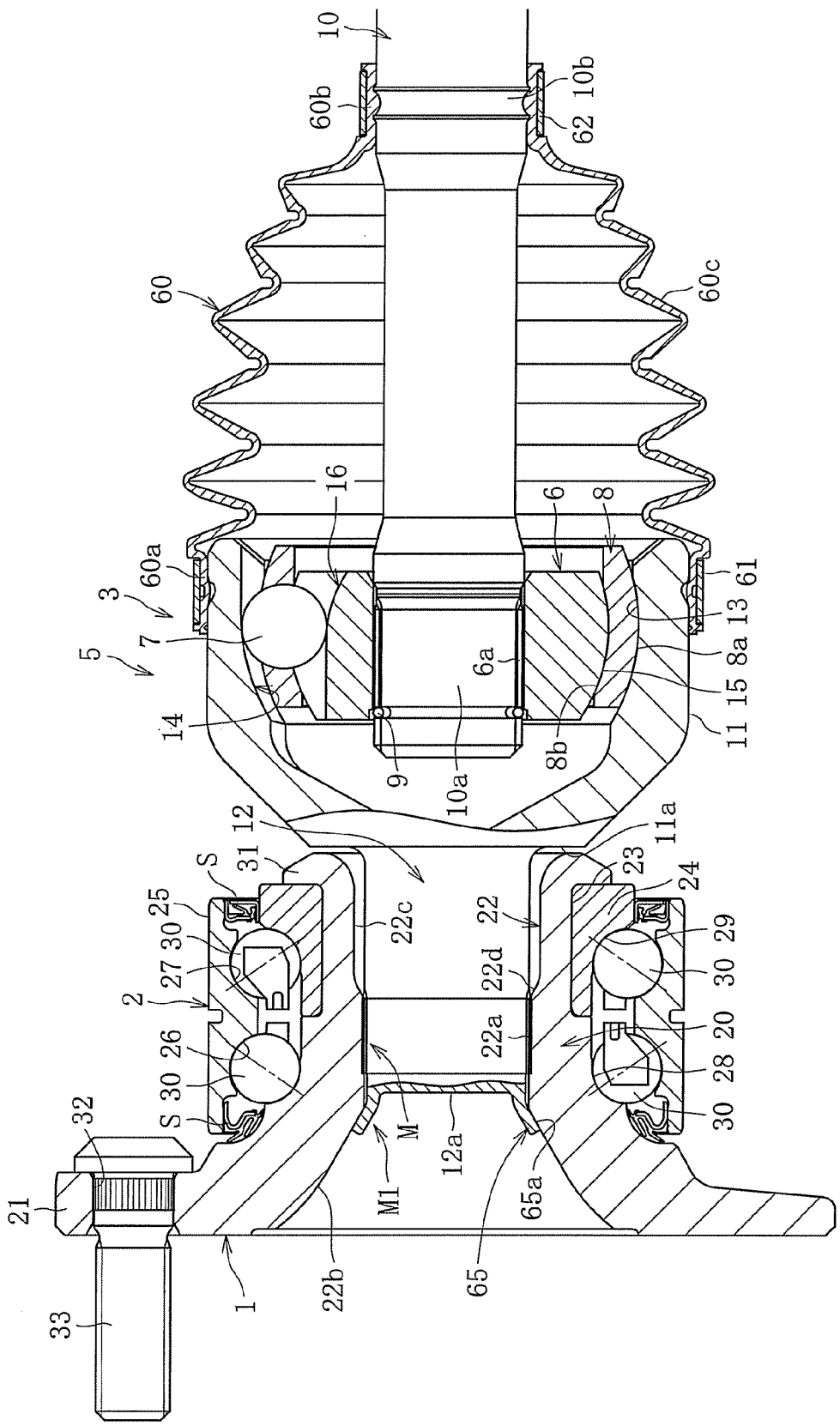
FIG. 1 is a vertical cross sectional view of a bearing device for a wheel and shows a first embodiment in accordance with the present invention.

1 Hub wheel
2 Bearing
3 Constant velocity universal joint
11 Mouth portion
12 Shaft portion
22 Hole portion
22a Shaft portion fitting hole
22e Stepped surface
24 Inner joint member
25 Outer member
26, 27 Outer raceway surface
28, 29 Inner raceway surface
31 Caulking portion
45 Protruding portion
50 Pocket portion
65 Taper-shaped locking piece
70 Taper-shaped locking piece
76 Outer collar-shaped locking piece
M Concave and convex fitting structure
M1 Shaft portion come-off preventing structure

BEST MODE FOR CARRYING OUT THE INVENTION

A description will be given below of embodiments in accordance with the present invention with reference to FIGS. 1 to 20. FIG. 1 shows a bearing device for a wheel in accordance with a first embodiment, and the bearing device for the wheel is constructed by integrating a hub wheel 1, a double row roller bearing 2, and a constant velocity universal joint 3.

The constant velocity universal joint 3 is constructed by having an outer joint member 5 serving as an outer joint member, an inner joint member 6 arranged in an inner side of the outer joint member 5 and serving as an inner joint member, a plurality of balls 7 interposed between the outer joint member 5 and the inner joint member 6 and transmitting torque, and a cage 8 interposed between the outer joint member 5 and the inner joint member 6 and retaining the balls 7, as main members. The inner joint member 6 is spline fitted by press-fitting an end portion 10a of a shaft 10 to a hole portion inner diameter 6a so as to be connected to the shaft 10 in such a manner as to freely transmit a torque. A stop ring 9 for preventing a shaft from coming off is fitted to the end portion 10a of the shaft 10.

The outer joint member 5 is constructed by a mouth portion 11 a stem portion (a shaft portion) 12, the mouth portion 11 is formed as a bowl shape which is open in one end, and a plurality of track grooves 14 extending in an axial direction are formed on an inner ball surface 13 thereof at uniform intervals in a circumferential direction. The track grooves 14 extend to an open end of the mouth portion 11. The inner joint member 6 is structured such that a plurality of grooves 16 extending in an axial direction are formed on an outer ball surface 15 thereof at uniform intervals in a circumferential direction.

The track groove 14 of the outer joint member 5 and the track groove 16 of the inner joint member 6 form a pair, and the ball 7 serving as a torque transmitting element is installed one by one in a ball track defined by each pair of track grooves 14 and 16 in a freely rollable manner. The ball 7 is interposed between the track groove 14 of the outer joint member 5 and the track groove 16 of the inner joint member 6 so as to transmit torque. The cage 8 is slidably interposed between the outer joint member 5 and the inner joint member 6, comes into contact with the inner ball surface 13 of the outer joint member 5 by an outer ball surface 8a, and comes into contact with an outer ball surface 15 of the inner joint member 6 by an inner ball surface 8b. The constant velocity universal joint in this case is of an undercut free type having a linear straight portion in a groove bottom of each of the track grooves 14 and 16; however, any other constant velocity universal joint such as Rzeppa type and the like is also possible.

Further, an opening portion of the mouth portion 11 is closed by a boots 60. The boots 60 is constructed by a large diameter portion 60a, a small diameter portion 60b, and a bellows portion 60c coupling the large diameter portion 60a and the small diameter portion 60b. The large diameter portion 60a is externally fitted to the opening portion of the mouth portion 11 and is fastened by a boots band 61 in this state, and the small diameter portion 60b is externally fitted to a boots mounting portion 10b of the shaft 10 and is fastened by a boots band 2 in this state.

The hub wheel 1 has a tube portion 20 and a flange 21 that is provided at an end portion on an opposite joint side of the tube portion 20. A hole portion 22 of the tube portion 20 is provided with a shaft portion fitting hole 22a of an intermediate portion in an axial direction, a taper hole 22b on an opposite joint side, and a large diameter hole 22c on a joint side. In other words, at the shaft portion fitting hole 22a, the shaft portion 12 of the outer joint member 5 of the constant velocity universal joint 3 and the hub wheel 1 are coupled via a concave and convex fitting structure M, described later. Further, a taper portion (a taper hole) 22d is provided between the shaft portion fitting hole 22a and the large diameter hole 22c. The taper portion 22d is reduced in diameter along a press-fitting direction at a time of coupling the hub wheel 1 and the shaft portion 12 of the outer joint member 5. A taper angle θ (refer to FIG. 3) of the taper portion 22d is set, for example, between 15 and 75 degrees.

The roller bearing 2 is provided with: an inner member having the hub wheel 1 and an inner joint member 24 fitted to a stepped portion 23 provided in a joint side of the tube portion 20 of the hub wheel 1; and an outer member 25 externally fitted so as to be astride between the tube portion 20 of the hub wheel 1 and the inner joint member 24. The outer member 25 is provided with two rows of outer raceway surfaces (outer races) 26 and 27 on its inner circumference. Further, on the inner member, there are formed a first inner raceway surface (an inner race) 28 provided on an outer circumference of the tube portion of the hub wheel 1 and opposed to the first outer raceway surface 26, and a second inner raceway surface (an inner race) 29 provided on an outer circumferential surface of the inner joint member 24 and opposed to the second outer raceway surface 27. Further, a ball serving as a rolling element 30 is interposed between the outer raceway surfaces 26 and 27 and the inner raceway surfaces 28 and 29 opposed thereto. A seal member S is installed to both opening portions of the outer member 25.

In this case, the end portion on the joint side of the hub wheel 1 is caulked to apply a preload to the roller bearing 2 by a caulked portion 31. Accordingly, it is possible to fasten the inner joint member 24 to the hub wheel 1. Further, a bolt mounting hole 32 is provided in the flange 21 of the hub wheel 1, and a hub bolt 33 for fixing a wheel and a brake rotor to the flange 21 is installed to the bolt mounting hole 32.

Figure 2A:
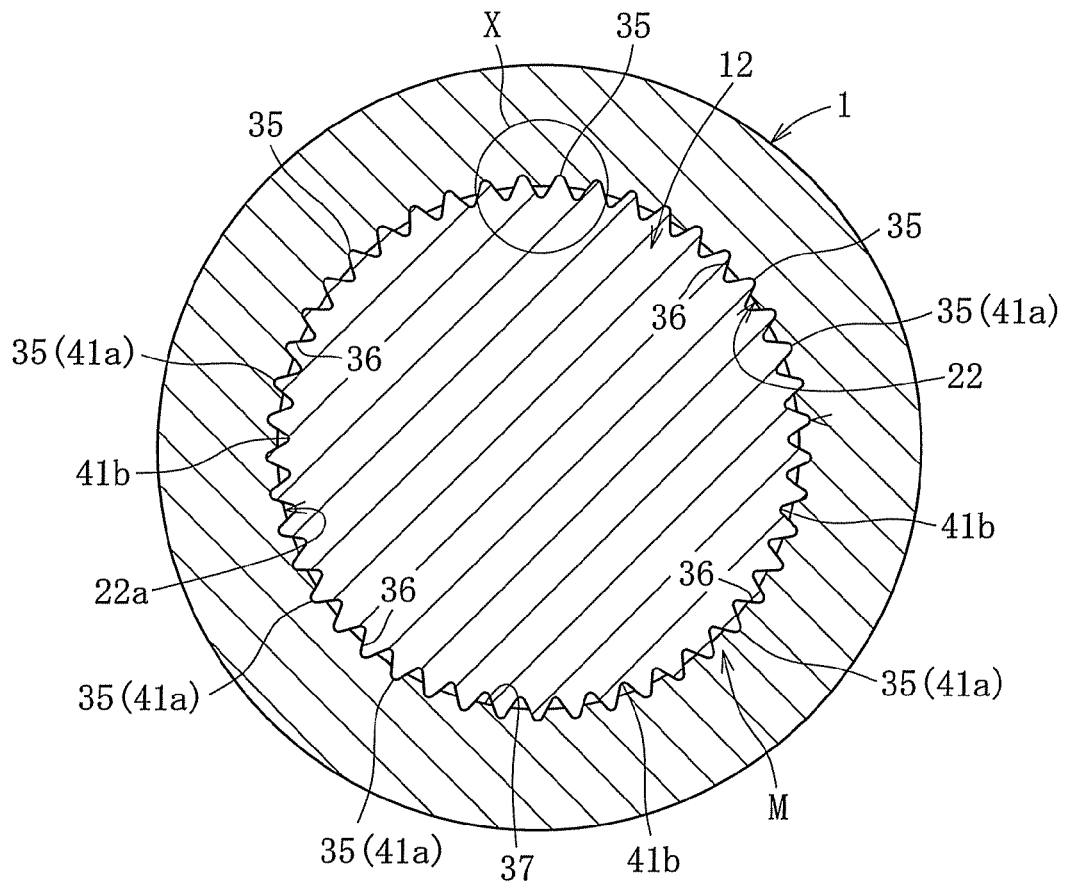
FIG. 2A is an enlarged cross sectional view of a concave and convex fitting structure of the bearing device for the wheel.
Figure 2B:
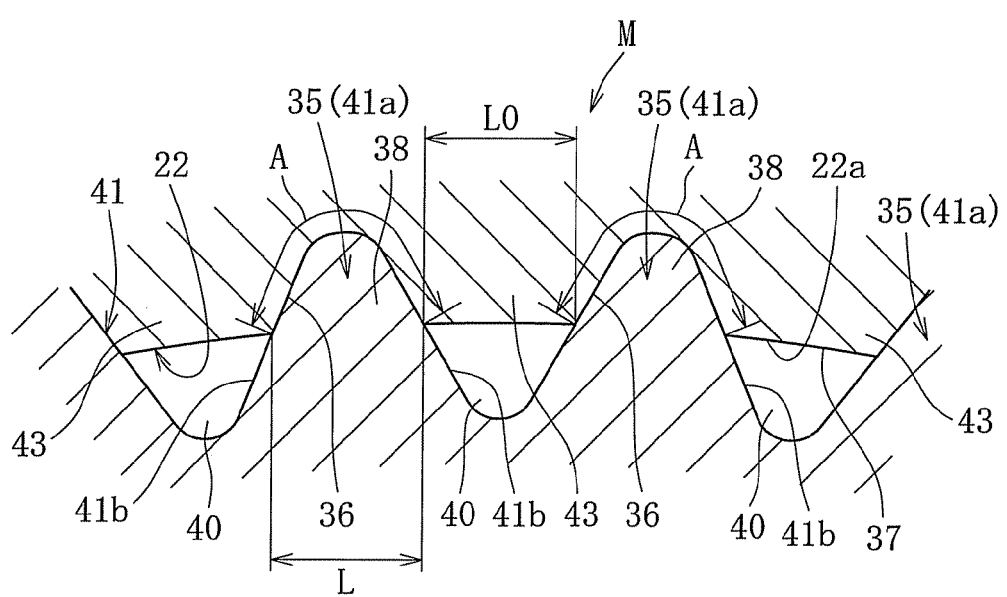
FIG. 2B is an enlarged view of a portion X in FIG. 2A.

As shown in FIGS. 2A, 2B, and 3, the concave and convex fitting structure M is constructed, for example, by a convex portion 35 which is provided on the end portion of the shaft portion 12 and extends in the axial direction, and a concave portion 36 which is formed on an inner surface (an inner surface 37 of the shaft portion fitting hole 22a in this case) of the hole portion 22 of the hub wheel 1, and an entire area of a fitting contact position 38 between the convex portion 35 and the concave portion 36 of the hub wheel 1 fitted to the convex portion 35 is in an intimately attached state. In other words, a plurality of convex portions 35 are arranged on an outer circumferential surface of the opposite mouth portion side of the shaft portion 12 at a predetermined pitch along a circumferential direction, and a plurality of concave portions 36 to which the convex portions 35 are fitted are formed on the inner surface 37 of the shaft portion fitting hole 22a of the hole portion 22 of the hub wheel 1 along the circumferential direction. That is, the convex portions 35 and the concave portions 36 fitted thereto are tight fitted around the entire circumference.

In this case, a cross section of each of the convex portions 35 is formed as a triangular shape (a chevron shape) having a convex round apex, and the concave portion fitting position of each of the convex portions 35 is a range A shown in FIG. 2B, and is a range from a middle portion of the chevron shape to a peak in the cross section. Further, a gap 40 that is closer to an inner diameter side than the inner surface 37 of the hub wheel 1 is formed between adjacent convex portions 35 in the circumferential direction.

In the above-described manner, the hub wheel 1 and the shaft portion 12 of the outer joint member 5 of the constant velocity universal joint 3 are coupled to each other via the concave and convex fitting structure M. At this time, since the end portion of the joint side of the hub wheel 1 is caulked to apply a preload to the roller bearing 2 by the caulked portion 31, it is not necessary to apply any preload to the inner joint member 24 by the mouth portion 11 of the outer joint member 5, thereby forming a non-contact state in which the mouth portion 11 is not in contact with the end portion of the hub wheel 1 (in this case, the caulked portion 31). Further, the caulked portion 31 may be brought into contact with a back surface 11a of the mouth portion 11, and a contact surface pressure in this case is set to be equal to or less than 100 MPa (not shown).

In the case of the above-described touch (contact), it is possible to construct the positioning of the shaft portion 12 of the outer joint member 5. In other words, the positioning stabilizes dimensional accuracy of the bearing apparatus for the wheel, it is possible to secure a length in an axial direction of the concave and convex fitting structure M arranged along the axial direction at a stable length, and it is possible to achieve improvement of torque transmissivity. If the contact surface pressure between the caulked portion 31 of the hub wheel 1 and the back surface 11a of the mouth portion 11 exceeds 100 MPa, there is a risk that an abnormal noise is generated. In other words, a difference is generated in torsional amount between the outer joint member 5 of the constant velocity universal joint 3 and the hub wheel 1 at a time of a large torque load, and this difference causes a significant slip to be generated in the contact portion between the outer joint member 5 of the constant velocity universal joint 3 and the hub wheel 1, thereby generating an abnormal noise. On the contrary, if the contact surface pressure is equal to or less than 100 MPa as in the present invention, it is possible to prevent a significant rapid slip, thereby suppressing generation of abnormal noise. Accordingly, it is possible to construct a silent bearing device for the wheel. It should be noted that even if the contact surface pressure is equal to or less than 100 MPa, it is necessary to secure at least a surface pressure at which the seal structure can be constructed.

Further, a shaft portion come-off preventing structure M1 is provided between the end portion of the shaft portion 12 of the outer joint member 5 and the inner surface 37 of the hub wheel 1. The shaft portion come-off preventing structure M1 is constructed by a taper-shaped locking piece 65 which extends to an opposite joint side from the end portion of the shaft portion 12 of the outer joint member 5 and locks to the taper hole 22b. In other words, the taper-shaped locking piece 65 is constructed by a ring-shaped body expanding from the joint side toward the opposite joint side, and at least a part of an outer circumferential surface 65a thereof comes into pressure contact with or comes into contact with the taper hole 22b.

Next, a description will be given of a fitting method of the concave and convex fitting structure M. In this case, as shown in FIG. 3, thermal hardening treatment is applied to the outer diameter portion of the shaft portion 12, and a spline 41 constructed by a convex rim 41a and a concave rim 41b extending along an axial direction is formed on a hardened layer H. Accordingly, the convex rim 41a of the spline 41 is hardened, thereby rendering the convex rim 41a the convex portion 35 of the concave and convex fitting structure M. In this case, the hardened layer H in this embodiment ranges from an outer end edge of the spline 41 to a part of a bottom wall of the mouth portion 11 of the outer joint member 5, as shown by a cross hatched portion. As the thermal hardening treatment, various kinds of heat treatment such as high-frequency quenching, a carburizing and quenching can be employed. In this case, the high-frequency quenching is a quenching method that applies the principle of: putting a portion necessary for quenching between a coil through which a high-frequency current flows; generating Joule heat on the basis of an electromagnetic induction action; and heating a conductive material. Further, the carburizing and quenching is a method of penetrating and diffusing carbon from a surface of a low carbon material, and then carrying out quenching. The spline 41 of the shaft portion 12 is provided with as small teeth as a module of 0.5 or less. As used herein, the module is a quotient of a pitch circle diameter by the number of teeth.

Further, it is possible to maintain an inner diameter side of the hub wheel 1 in a non-quenching state. In other words, the inner surface 37 side of the hole portion 22 of the hub wheel 1 may be an unhardened portion (a non-quenched state), to which no thermal hardening treatment is carried out. A hardness difference between the hardened layer H of the shaft portion 12 of the outer joint member 5 and the unhardened portion of the hub wheel 1 is equal to or more than 30 points in HRC.

At this time, an intermediate position in a protruding direction of the convex portion 35 corresponds to a position of a concave portion forming surface (the inner surface 37 of the hole portion 22 of the hub wheel 1 in this case) before formation of the concave portion. In other words, an inner diameter dimension D of the inner surface 37 of the hole portion 22 is set to be smaller than a maximum outer diameter of the convex portion 35, that is, a maximum diameter dimension (a circumscribed circle diameter) D1 of a circular arc connecting apexes of the convex portions 35 corresponding to the convex rim 41a of the spline 41, and be larger than a diameter dimension D2 of a circular arc connecting roots between the convex portions (bottoms of the concave rims 41b of the spline 41). In other words, a relationship D2<D<D1 is established.

The spline 41 can be formed by various working methods such as rolling, cutting, pressing, and drawing. Further, as the thermal hardening treatment, various kinds of heat treatment such as high-frequency quenching, and carburizing and quenching can be employed.

Further, a short cylinder portion 66 for constructing the taper-shaped locking piece 65 is protruded along the axial direction from an outer peripheral edge portion of the end surface 12a of the shaft portion 12. An outer diameter D4 of the short cylinder portion 66 is set to be smaller than the inner diameter dimension D of the fitting hole 22a of the hole portion 22. In other words, the short cylinder portion 66 serves as an aligning member at a time of pre press-fitting the shaft portion 12 to the hole portion 22 of the hub wheel 1, as described later.

Further, as shown in FIG. 3, the shaft portion 12 of the outer joint member 5 is inserted (press-fitted) to the hub wheel 1 in a state in which an axis of the hub wheel 1 is aligned with an axis of the outer joint member 5 of the constant velocity universal joint 3. At this time, since the taper portion 22d reducing in diameter along the press-fitting direction is formed in the hole portion 22 of the hub wheel 1, the taper portion 22d can serve as a guide at a time of starting the press-fit. Further, the relationship mentioned above exists among the inner diameter dimension D of the inner surface 37 of the hole portion 22, the maximum outer diameter dimension D1 of the convex portions 35, and the outer diameter dimension D2 of the roots between the convex portions, while the hardness of the convex portion 35 is 30 points or more larger than the hardness of the inner surface 37 of the hole portion 22. Accordingly, the convex portion 35 cuts into the inner surface 37 by press-fitting the shaft 10 into the hole portion 22 of the hub wheel 11, and the convex portion 35 is to form the concave portion 36 to which the convex portion 35 is fitted along the axial direction.

Accordingly, as shown in FIGS. 2A and 2B, the entire fitting contact position 38 between the convex portion 35 at the end portion of the shaft portion 12 and the concave portion 36 fitted thereto is in an intimately attached state. In other words, the shape of the convex portion 35 is transcribed to the concave portion forming surface on the other side (the inner surface 37 of the hole portion 22 in this case). At this time, the cutting of the convex portion 35 into the inner surface 37 of the hole portion 22 turns the hole portion 22 into a slightly expanded state, thereby allowing the movement in the axial direction of the convex portion 35, and if the movement in the axial direction is stopped, the hole portion 22 attempts to return to its original diameter, thus reducing in diameter. In other words, the hub wheel 1 is elastically deformed in a diametrical direction at a time of press-fitting the convex portion 35, and a preload corresponding to the elastic deformation is applied to the tooth surface of the convex portion 35 (surface of the concave portion fitting position). Accordingly, it is possible to securely form the concave and convex fitting structure M in which the entire concave portion fitting position of the convex portion 35 is intimately attached to the corresponding concave portion 36.

Figure 4:
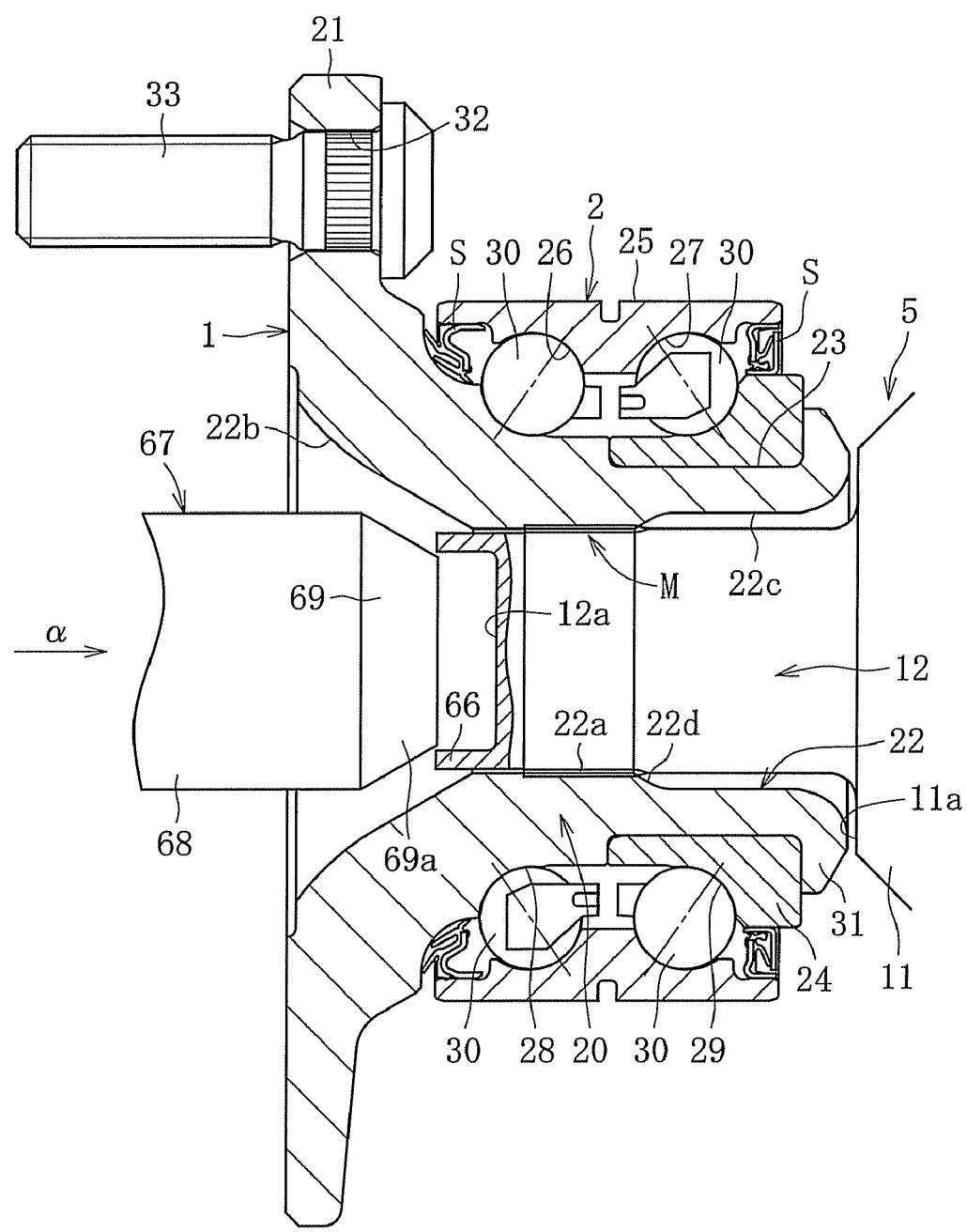
FIG. 4 is a cross sectional view showing an assembling method of the bearing device for the wheel.

As described above, in a state in which the shaft portion 12 of the outer joint member 5 is integrated with the hub wheel 1 via the concave and convex fitting structure M by press-fitting the shaft portion 12 of the outer joint member 5 into the hole portion 22 of the hub wheel 1, the short cylinder portion 66 protrudes from the fitting hole 22a to the taper hole 22b side, as shown in FIG. 4.

Figure 5:
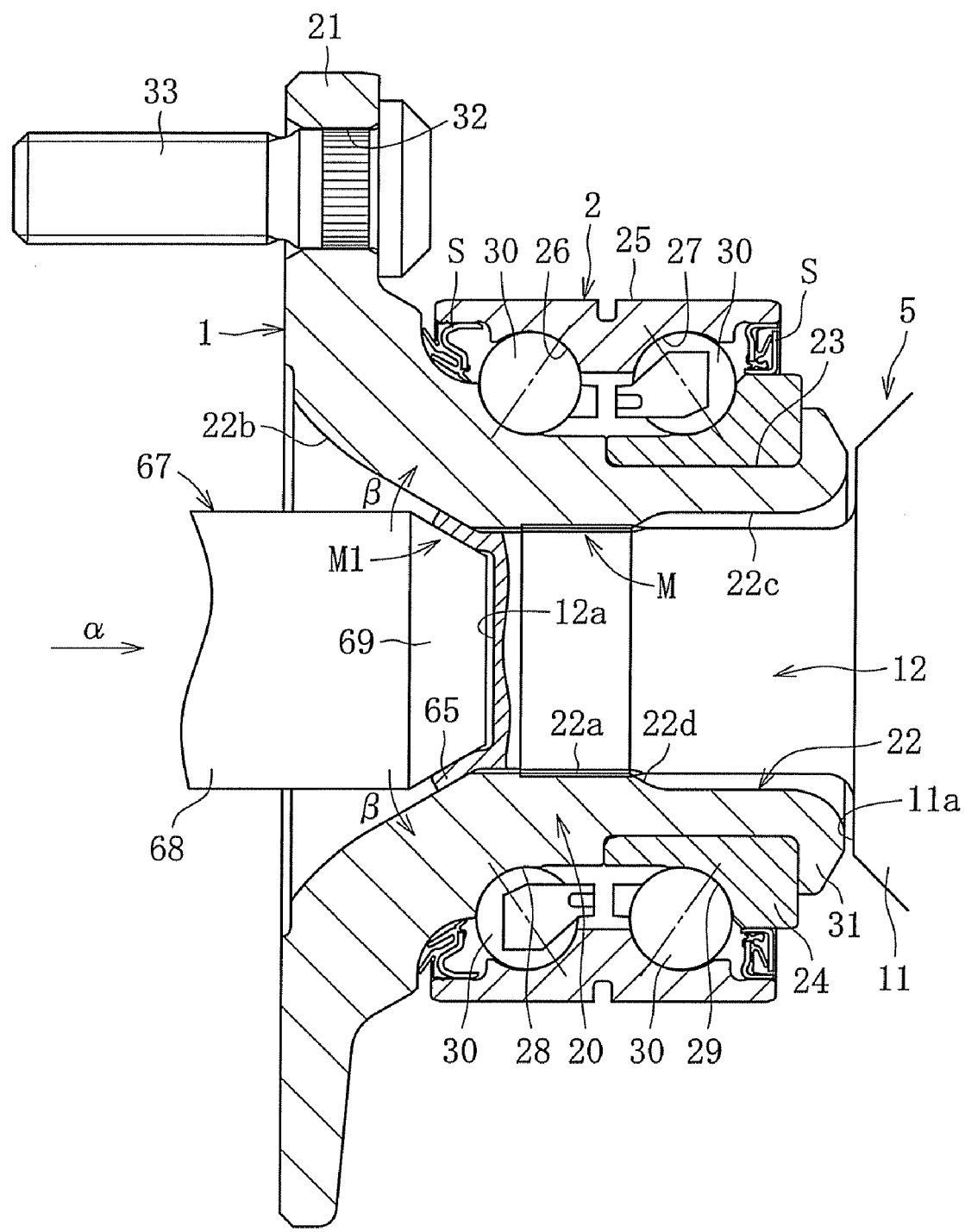
FIG. 5 is a cross sectional view showing the assembling method of the bearing device for the wheel.

Then, the short cylinder portion 66 is enlarged in diameter by using a jig 67. The jig 67 is provided with a columnar main body portion 68 and a circular truncated cone portion 69 continuously provided on a leading end portion of the main body portion 68. The circular truncated cone portion 69 of the jig 67 is structured such that an angle of incline of an inclined surface 69a is set to be approximately identical to an angle of incline of the taper hole 22b, and an outer diameter of a leading end of the circular truncated cone portion 69 is set to a dimension which is identical to an inner diameter of the short cylinder portion 66 or is slightly smaller than the inner diameter of the short cylinder portion 66. Further, as shown in FIG. 5, a load in a direction of an arrow α is applied by fitting the circular truncated cone portion 69 of the jig 67 via the taper hole 22b, whereby an expanding force in a direction of an arrow β by which the short cylinder portion 66 is expanded is applied to the inner diameter side of the short cylinder portion 66. At this time, by the circular truncated cone portion 69 of the jig 67, at least a part of the short cylinder portion 66 is pressed to the inner surface side of the taper hole 22b and turned into a state of pressure contact or contact with the inner surface of the taper hole 22b, thereby constructing the shaft portion come-off preventing structure M1. In this case, it is necessary to fix the bearing device for the wheel to prevent it from moving in the direction of the arrow α at a time of applying the load in the direction of the arrow α of the jig 67. It is sufficient to receive a part of the hub wheel 1, the constant velocity universal joint 3, or the like by a fixing member. Incidentally, the inner surface of the short cylinder portion 66 may be formed as a taper shape expanding in the shaft end side. By forming in the shape mentioned above, it is possible to form the inner surface by forging, and it is possible to lead to a cost reduction.

Further, in order to reduce the load in the direction of the arrow α of the jig 67, a notch may be formed on the short cylinder portion 66, or the conical surface of the circular truncated cone portion 69 of the jig 67 may be arranged partly in the circumferential direction. In the case of forming the notch on the short cylinder portion 66, it becomes easy to expand the short cylinder portion 66. Further, in the case that the conical surface of the circular truncated cone portion 69 of the jig 67 is arranged partly in the circumferential direction, the position at which the short cylinder portion 66 is enlarged in diameter becomes a part on the circumference. Accordingly, it is possible to reduce the pressing load of the jig 67.

In the present invention, since the entire fitting contact position 38 between the convex portion 35 and the concave portion 36 is in an intimately attached state in the concave and convex fitting structure M, there is no gap by which a play is generated in the diametrical direction and the circumferential direction in the fitting structure M. Accordingly, all the fitting positions contribute to the rotational torque transmission, it is possible to transmit torque stably, and no abnormal noise is generated.

It is not necessary to form the spline portion or the like on the member on which the concave portion 36 is to be formed (the hub wheel 1 in this case), excellent productivity is obtained, there is no need for phase alignment between splines, it is possible to achieve an improvement of assembly efficiency, it is possible to avoid damage to the teeth surfaces at a time of press-fitting, and a stable fitted state can be maintained.

Since the taper portion 22d can serve as a guide at a time of starting the press-fit, it is possible to press-fit the shaft portion 12 of the outer joint member 5 to the hole portion 22 of the hub wheel 1 without generating displacement, and it is possible to stably transmit torque. Further, the short cylinder portion 66 is set such that the outer diameter D4 thereof is smaller than the inner diameter dimension D of the fitting hole 22a of the hole portion 22, and thus serves as an aligning member, making it possible to press-fit the shaft portion into the hub wheel while preventing axial displacement, resulting in more stable press-fit.

By the shaft portion come-off preventing structure M1, it is possible to effectively prevent the shaft portion 12 of the outer joint member 5 from coming off from the hole portion 22 of the hub wheel 1 (particularly coming off in the axial direction to the shaft side). Accordingly, it is possible to maintain a stable coupling state, and it is possible to achieve high quality of the bearing device for the wheel. Further, since the shaft portion come-off preventing structure M1 is constructed by the taper-shaped locking piece 65, it is possible to eliminate the conventional screw fastening. Accordingly, it is not necessary to form a thread portion protruding from the hole portion 22 of the hub wheel 1 in the shaft portion 12, it is possible to eliminate the thread fastening work as well as achieving a reduction in weight, and it is possible to achieve an improvement of assembling workability. Further, in the taper-shaped locking piece 65, it is sufficient to expand a part of the shaft portion 12 of the outer joint member 5, and it is possible to easily form the shaft portion come-off preventing structure M1. In this case, a pressing force in a direction of further press-fitting the shaft portion 12 is necessary for moving the shaft portion 12 of the outer joint member 5 in an opposite joint direction, and displacement of the shaft portion 12 in the outer joint member 5 in the opposite joint direction seldom occurs, and if the displacement in this direction occurs, the bottom portion of the mouth portion 11 of the outer joint member 5 touches the caulked portion 31 of the hub wheel 1, and the shaft portion 12 of the outer joint member 5 does not come off from the hub wheel 1.

Since the hardness of the end portion in the axial direction of the convex portion of the shaft portion 12 of the outer joint member 5 of the constant velocity universal joint 3 is made higher than the inner diameter portion of the hole portion of the hub wheel 1, and the shaft portion 12 is press-fitted to the hole portion 22 of the hub wheel 1 from the end portion side in the axial direction of the convex portion 35, it becomes easy to form the concave portion on the inner surface of the hole portion of the hub wheel 1. Further, it is possible to increase the hardness on the shaft portion side, and it is possible to improve the torsional strength of the shaft portion 12.

Since the spline 41 formed on the shaft portion 12 uses as small teeth as a module 0.5 or less as in the embodiment mentioned above, it is possible to achieve a reduction of the press-fitting load as well as improving the molding characteristic of the spline 41. In this case, since the convex portion 35 can be constructed by the spline generally formed on this kind of shaft, it is possible to easily form the convex portion 35 at low cost.

Further, if the concave portion 36 is formed by press-fitting the shaft portion 12 into the hub wheel 1, work hardening occurs on the concave portion 36 side. As used herein, the work hardening means that when plastic deformation (a plastic working) is applied to an object, resistance against the deformation increases as the degree of the deformation increases, whereby this part of the material becomes harder than the rest of the material not subjected to deformation. Therefore, the inner surface 37 of the hub wheel 1 on the concave portion 36 side is hardened by plastically deforming at a time of press-fitting, whereby it is possible to achieve an improvement of the rotational torque transmissivity.

The inner diameter side of the hub wheel 1 is comparatively soft. Accordingly, it is possible to achieve an improvement of the fittability (intimate attacheability) at a time of fitting the convex portion 35 of the outer surface of the shaft portion 12 of the outer joint member 5 to the concave portion 36 of the inner surface of the hole portion of the hub wheel 1, and it is possible to accurately prevent a play from being generated in the diametrical direction and the circumferential direction.

In this case, in the spline 41 shown in FIG. 3, a pitch of the convex rim 41a and a pitch of the concave rim 41b are set identically. Accordingly, in the embodiment mentioned above, as shown in FIG. 2B, a thickness L in a circumferential direction of the intermediate position in the protruding direction of the convex portion 35 becomes approximately identical to a dimension L0 in the circumferential direction at a position corresponding to the intermediate position between the adjacent convex portions 35 in the circumferential direction.

Figure 6:
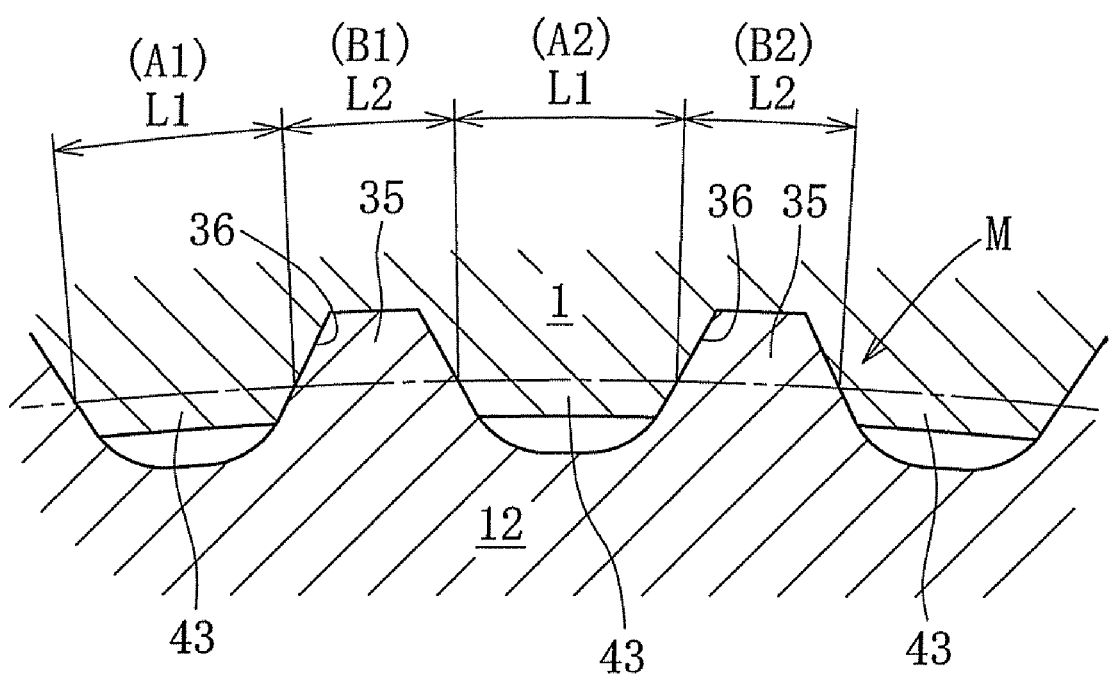
FIG. 6 is a main-parts enlarged cross sectional view showing a modified example of a concave and convex fitting structure.

On the contrary, as shown in FIG. 6, a thickness L2 in the circumferential direction of the intermediate position in the protruding direction of the convex portion 35 may be smaller than a dimension L1 in the circumferential direction at the position corresponding to the intermediate position between the adjacent convex portions 35 in the circumferential direction. In other words, in the spline 41 formed on the shaft portion 12, the thickness (the tooth thickness) L2 in the circumferential direction of the intermediate position in the protruding direction of the convex portion 35 is made smaller than the thickness (the tooth thickness) L1 in the circumferential direction of the intermediate position in the protruding direction of the convex portion 35 on the hub wheel 1 side fitted between the convex portions 35.

Accordingly, a summation Σ(B1+B2+B3+ . . . ) of the tooth thickness of the convex portions 35 on the entire circumference on the shaft portion 12 side is set to be smaller than a summation Σ(A1+A2+A3+ . . . ) of the tooth thickness of peak portions 43 (convex tooth between adjacent convex portions along the circumferential direction) on the hub wheel 1 side. Accordingly, it is possible to enlarge a shear area of the peak portion 43 on the hub wheel 1 side, and it is possible to secure torsional strength. Further, since the tooth thickness of the convex portion 35 is small, it is possible to make the press-fitting load small, and it is possible to achieve an improvement of the press-fitting characteristic. In the case that the summation of the thicknesses in the circumferential direction of the convex portions 35 is made smaller than the summation of the thicknesses in the circumferential direction of the peak portions 43 on the other side, it is not necessary to make the thickness L2 in the circumferential direction smaller than the dimension L1 in the circumferential direction between the adjacent convex portions 35 in the circumferential direction (the dimension in the circumferential direction of the peak portion 43) in all the convex portions 35. In other words, even if the thickness in the circumferential direction of any convex portion 35 of the plurality of convex portions 35 is identical to the dimension in the circumferential direction between the adjacent convex portions in the circumferential direction or is larger than the dimension in the circumferential direction, it is sufficient that the thickness is smaller as a whole. In this case, the convex portion 35 in FIG. 6 is formed as a trapezoidal shape cross section.

Figure 7:
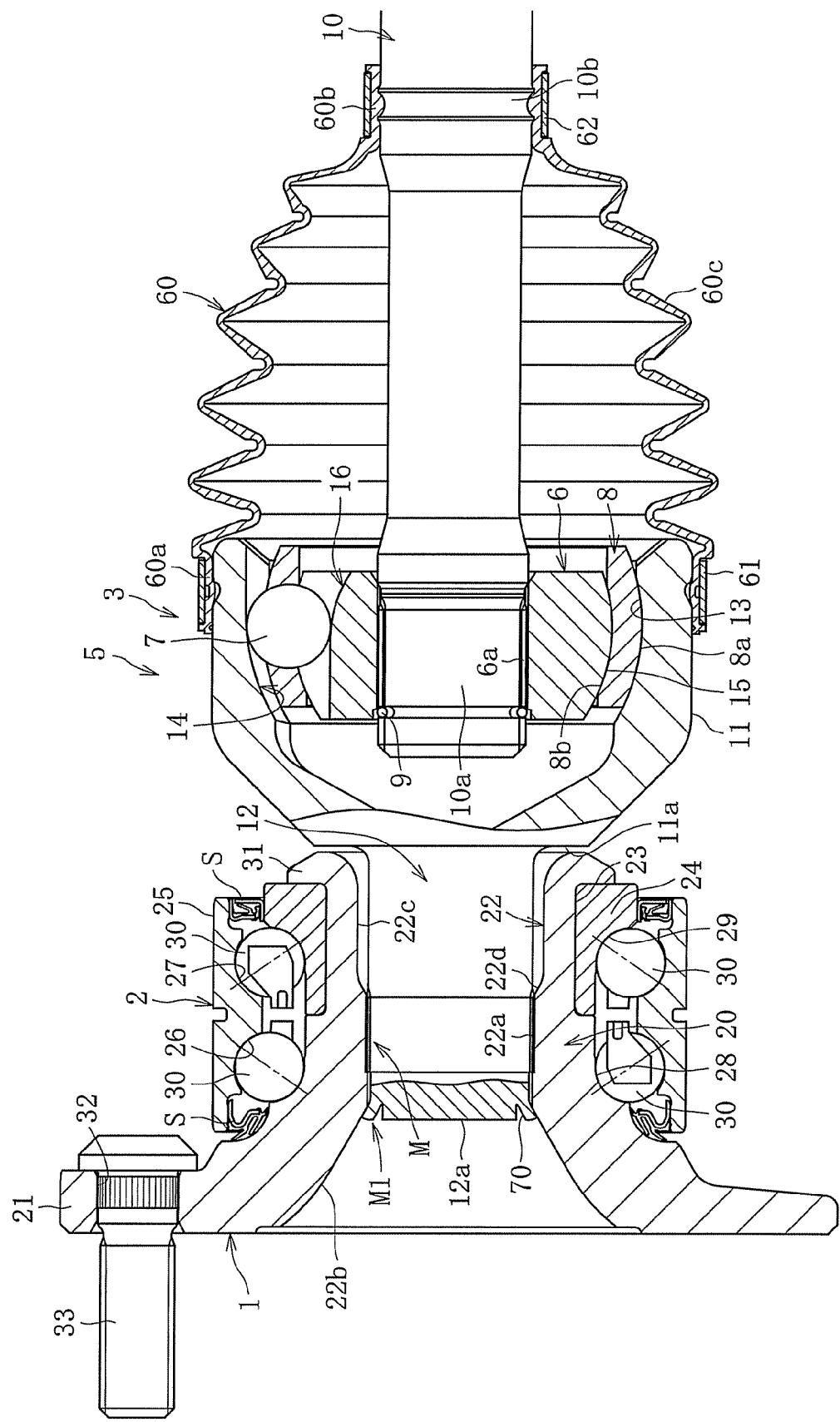
FIG. 7 is a vertical cross sectional view of a bearing device for a wheel and shows a second embodiment in accordance with the present invention.

FIG. 7 shows a second embodiment, where a shaft portion come-off preventing structure M1 of the bearing device for the wheel is constructed by providing a taper-shaped locking piece 70 protruding in an outer diameter direction partly in the shaft portion 12, without previously forming the short cylinder portion 66 as shown in FIG. 4.

Figure 8:
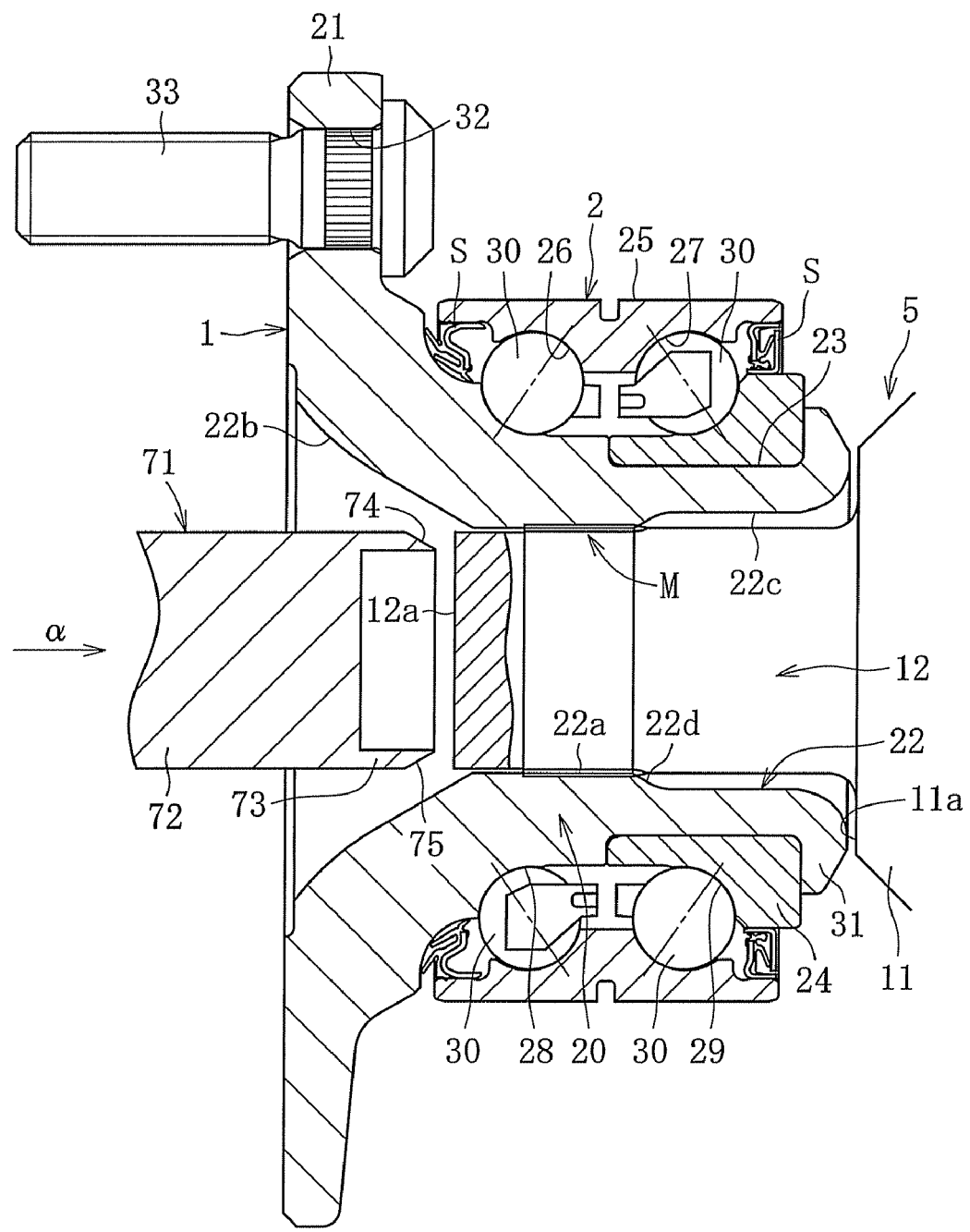
FIG. 8 is a vertical cross sectional view showing an assembling method of the bearing device for the wheel in FIG. 7.
Figure 9:
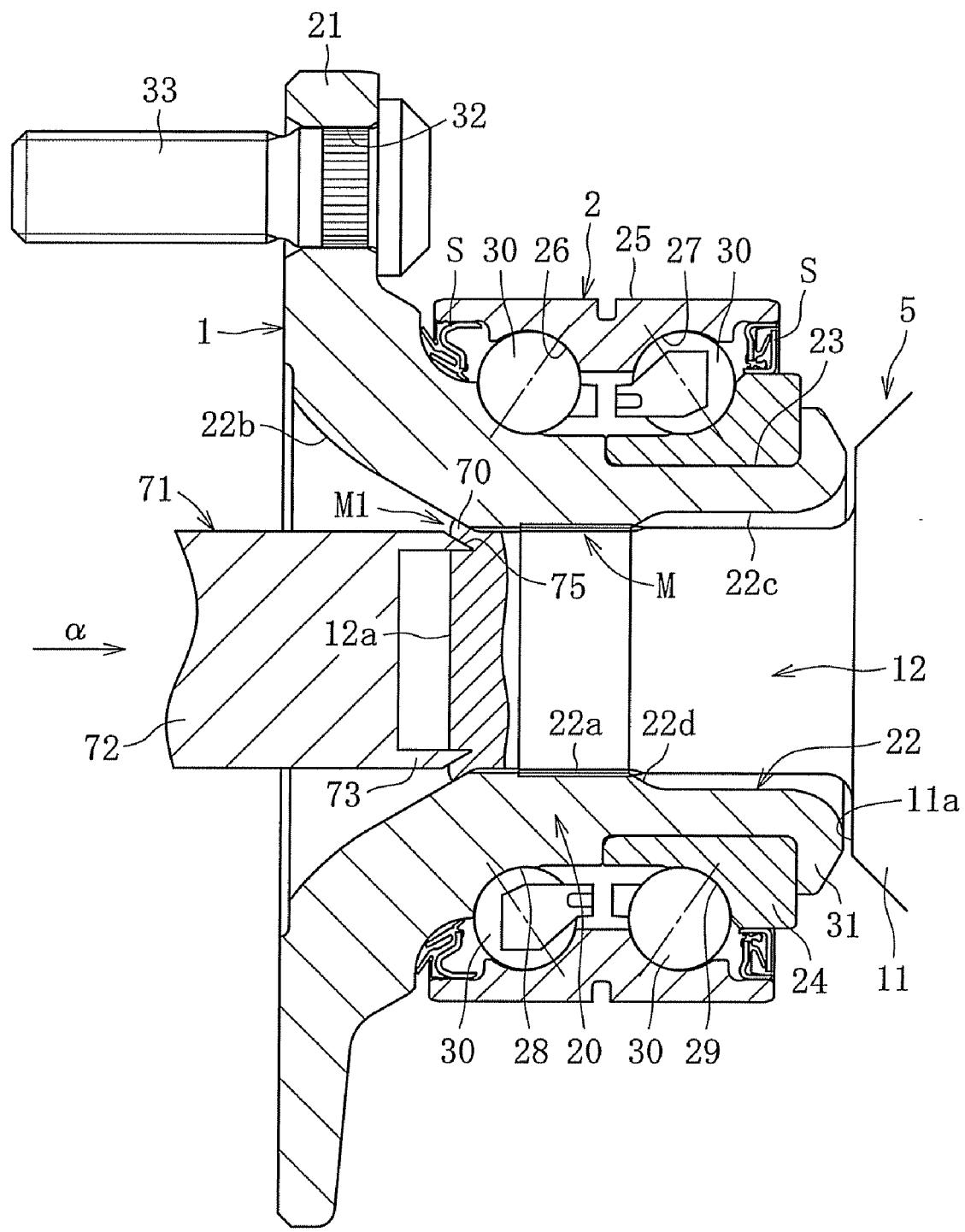
FIG. 9 is a vertical cross sectional view showing the assembling method of the bearing device for the wheel in FIG. 7.

In this case, a jig 71 shown in FIG. 8 is used. The jig 71 is provided with a columnar main body portion 72 and a short cylinder portion 73 continuously provided in a leading end portion of the main body portion 72, and is provided with a notch portion 74 on a leading end of an outer circumferential surface of the short cylinder portion 73. Accordingly, a leading end wedge portion 75 is formed on the jig 71. If the leading end wedge portion 75 is struck (the load in the direction of the arrow α is applied), a cross sectional shape of the leading end wedge portion 75 is formed as an inclined surface on an outer diameter side, and the outer diameter side of the end portion of the shaft portion 12 is expanded by the notch portion 74 forming the inclined surface.

Accordingly, at least a part of the taper-shaped locking piece 70 comes into pressure contact or is in contact with the inner surface of the taper hole 22b. Accordingly, even by the taper-shaped locking piece 70, in the same manner as the taper-shaped locking piece 65 shown in FIG. 1 or the like, it is possible to effectively prevent the shaft portion 12 of the outer joint member 5 from coming off in the axial direction from the hole portion 22 of the hub wheel 1. Accordingly, it is possible to maintain a stable coupling state, and it is possible to achieve high quality of the bearing device for the wheel. In this case, the inner surface of the leading end wedge portion 75 may be formed as a taper shape.

Figure 10:
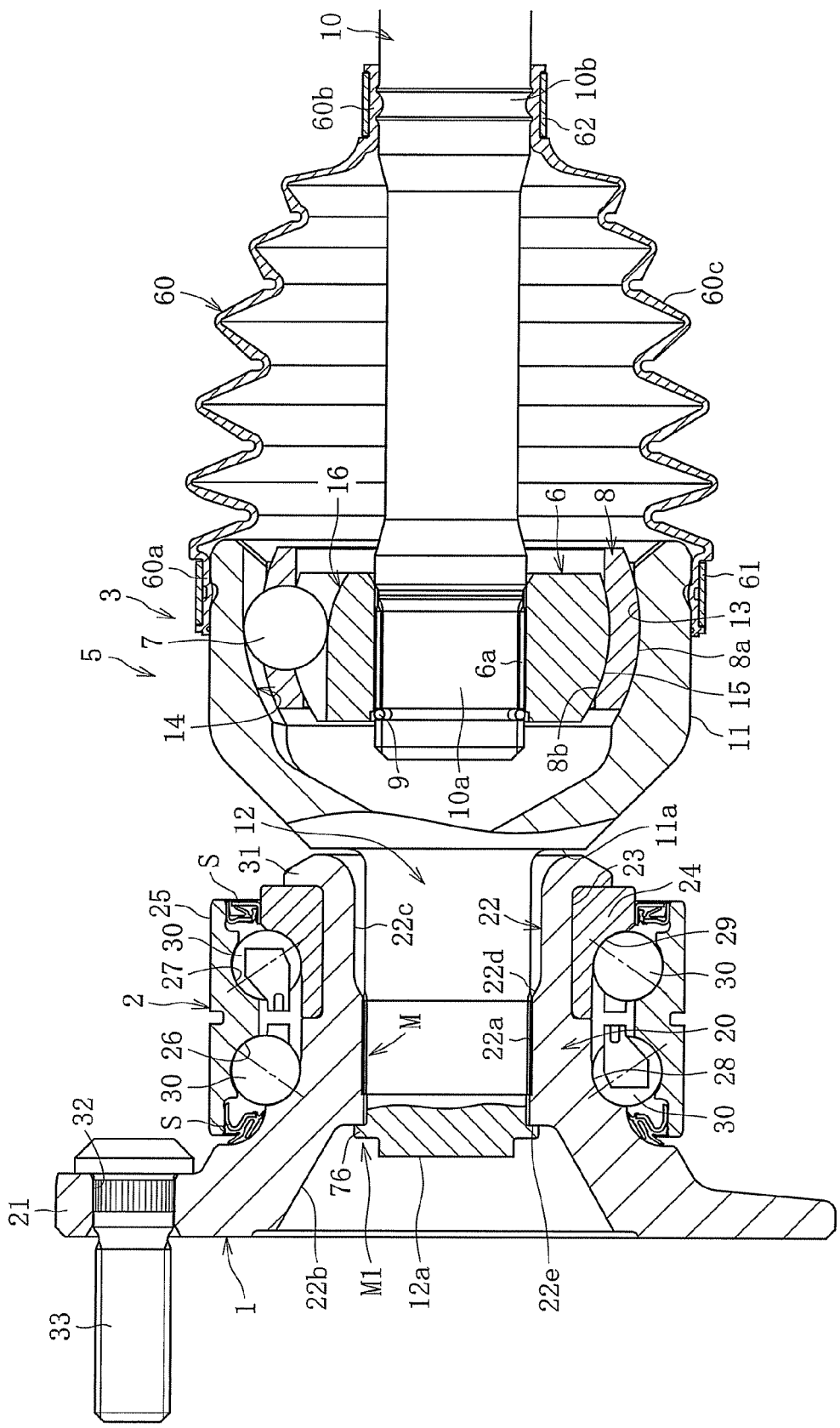
FIG. 10 is a vertical cross sectional view of a bearing device for a wheel and shows a third embodiment in accordance with the present invention.

FIG. 10 shows a third embodiment, where a shaft portion come-off preventing structure M1 of the bearing device for a wheel is constructed by an outer collar shaped locking piece 76 which is formed by caulking a part of the shaft portion 12 so as to protrude in an outer diameter direction. In this case, the hole portion 22 of the hub wheel 1 is provided with a stepped surface 22e between the fitting hole 22a and the taper hole 22b, and the outer collar shaped locking piece 76 is locked to the stepped surface 22e.

Figure 11:
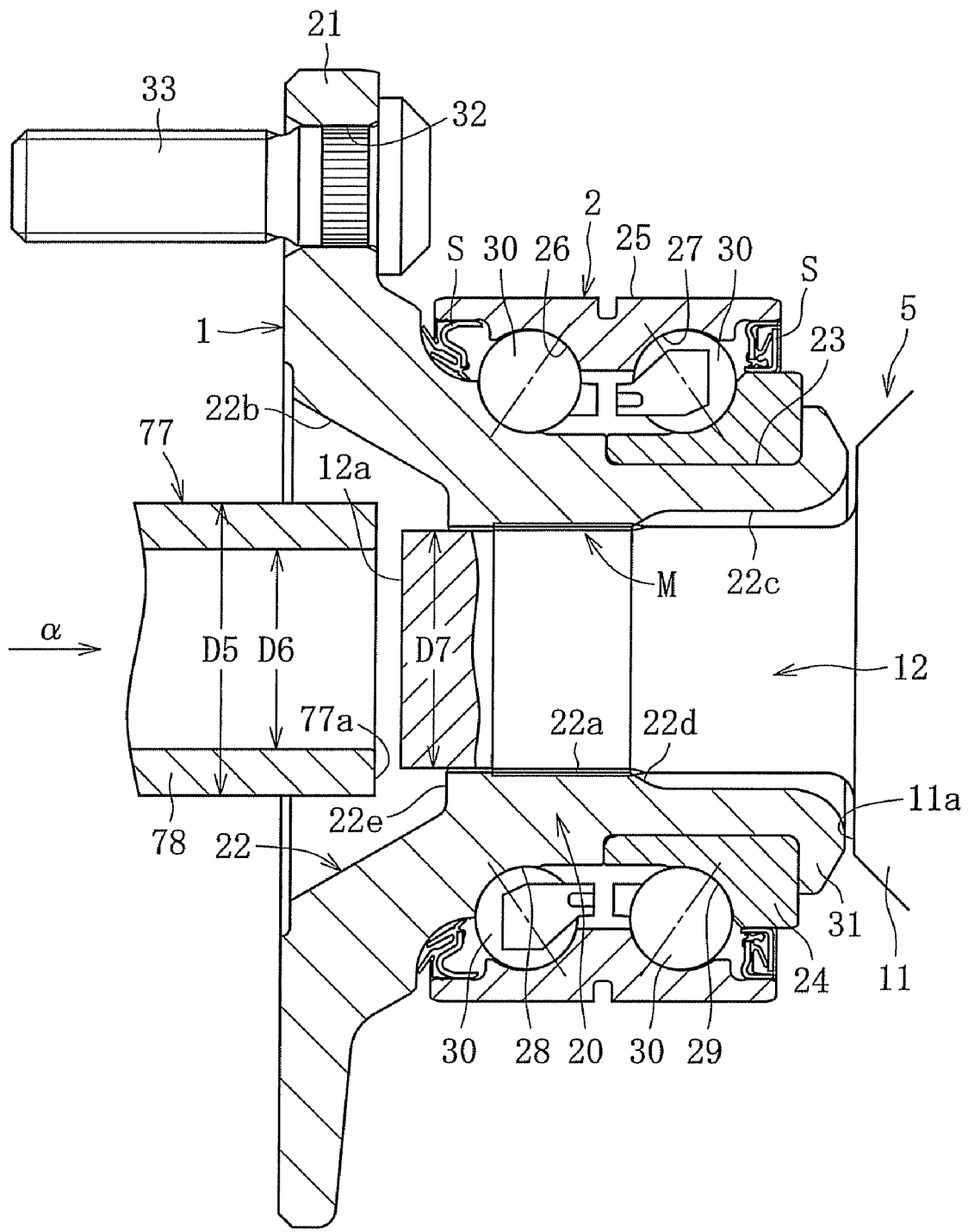
FIG. 11 is a vertical cross sectional view of the bearing device for the wheel in FIG. 10.

In this shaft portion come-off preventing structure M1, a jig 77 shown in FIG. 11 is used. The jig 77 is provided with a cylinder body 78. An outer diameter D5 of the cylinder body 78 is set to be larger than an outer diameter D7 of an end portion of the shaft portion 12, and an inner diameter D6 of the cylinder body 78 is set to be smaller than the outer diameter D7 of the end portion of the shaft portion 12.

Figure 12:
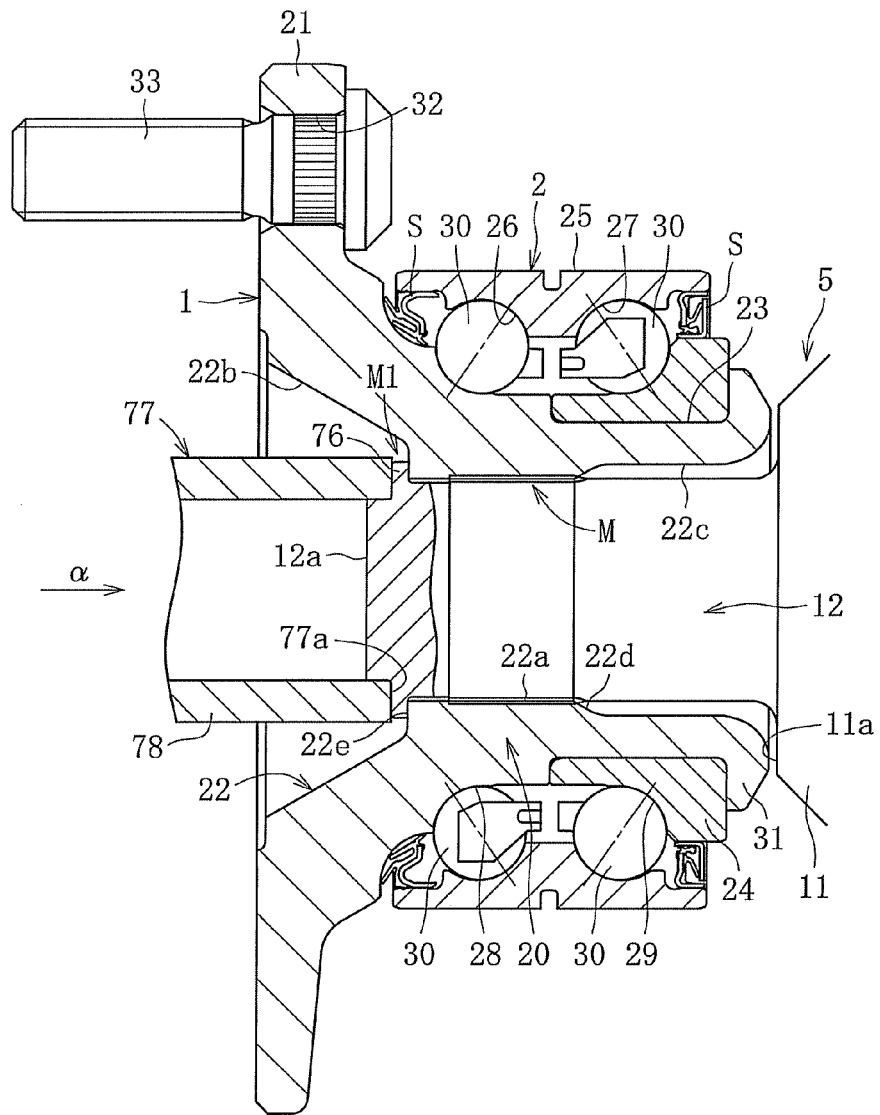
FIG. 12 is a vertical cross sectional view of the bearing device for the wheel in FIG. 10.

Accordingly, if the jig 77 is aligned axially with the shaft portion 12 of the outer joint member 5, and a load is applied to the end surface 12a of the shaft portion 12 in the direction of the arrow by an end surface 77a of the jig 77 in this state, then an outer peripheral side of the end surface 12a of the shaft portion 12 is crashed and the outer collar shaped locking piece 76 can be formed, as shown in FIG. 12.

Even in the case of the outer collar shaped locking piece 76 as described above, since the outer collar shaped locking piece 76 locks to the stepped surface 22e, it is possible to effectively prevent the shaft portion 12 of the outer joint member 5 from coming off in the axial direction from the hole portion 22 of the hub wheel 1, in the same manner as the taper-shaped locking piece 65 shown in FIG. 1 or the like. Accordingly, it is possible to maintain a stable coupling state, and it is possible to achieve high quality of the bearing device for the wheel.

Figure 13A:
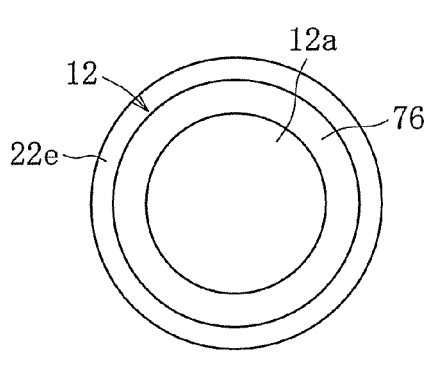
FIG. 13A is an end elevational view of an outer collar-shaped locking portion all around an entire circumference.
Figure 13B:
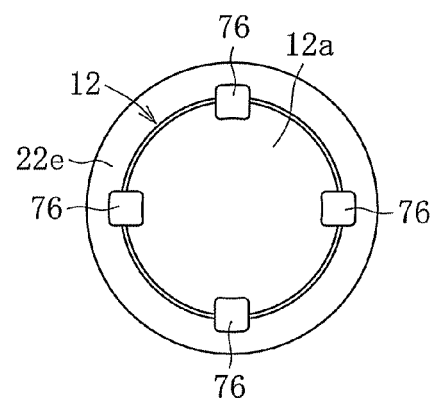
FIG. 13B is an end elevational view of an outer collar-shaped locking portion arranged at a predetermined pitch along a circumferential direction.

If the jig 77 as shown in FIGS. 11 and 12 is used, the outer collar shaped locking piece 76 is formed along the circumferential direction, as shown in FIG. 13A. Accordingly, if the pressing portions are arranged as the jig at a predetermined pitch (for example, 90 degree pitch) along the circumferential direction, a plurality of outer collar shaped locking pieces 76 are arranged at the predetermined pitch along the circumferential direction, as shown in FIG. 13B. As shown in FIG. 13B, even if a plurality of outer collar shaped locking pieces 76 are arranged at a predetermined pitch along the circumferential direction, the outer collar shaped locking pieces 76 lock to the stepped surface 22e. Accordingly, it is possible to effectively prevent the shaft portion 12 of the outer joint member 5 from coming off in the axial direction from the hole portion 22 of the hub wheel 1.

Figure 14:
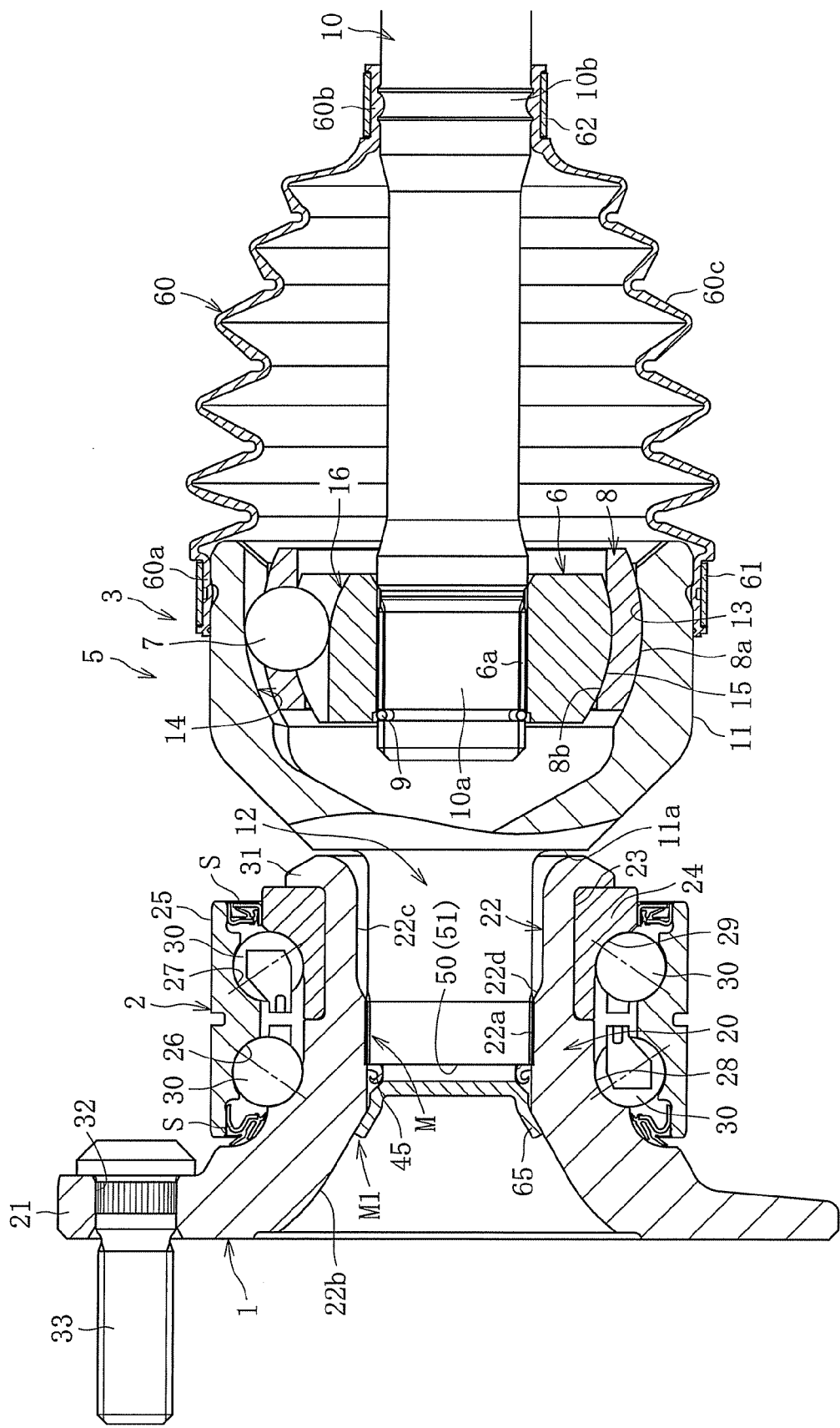
FIG. 14 is a vertical cross sectional view of a bearing device for a wheel and shows a fourth embodiment in accordance with the present invention.

If the shaft portion 12 of the outer joint member 5 is press-fitted to the hub wheel 1, the material protrudes from the concave portion 36 formed by the convex portion 35, and a protruding portion 45 as shown in FIG. 14 is formed. The protruding portion 45 is a volume of material of the concave portion 36 to which the concave portion fitting position of the convex portion 35 is fitted, and is constructed by a volume of material that is pushed out from the concave portion 36 to be formed, cut for forming the concave portion 36, or both pushed out and cut.

Accordingly, in the bearing device for the wheel shown in FIG. 1 or the like, the removing work of the protruding portion 45 is necessary after uniting the constant velocity universal joint to the hub wheel 1. Accordingly, in the fourth embodiment shown in FIG. 14, the shaft portion 12 is provided with a pocket portion 50 storing the protruding portion 45, as described above.

Figure 15:
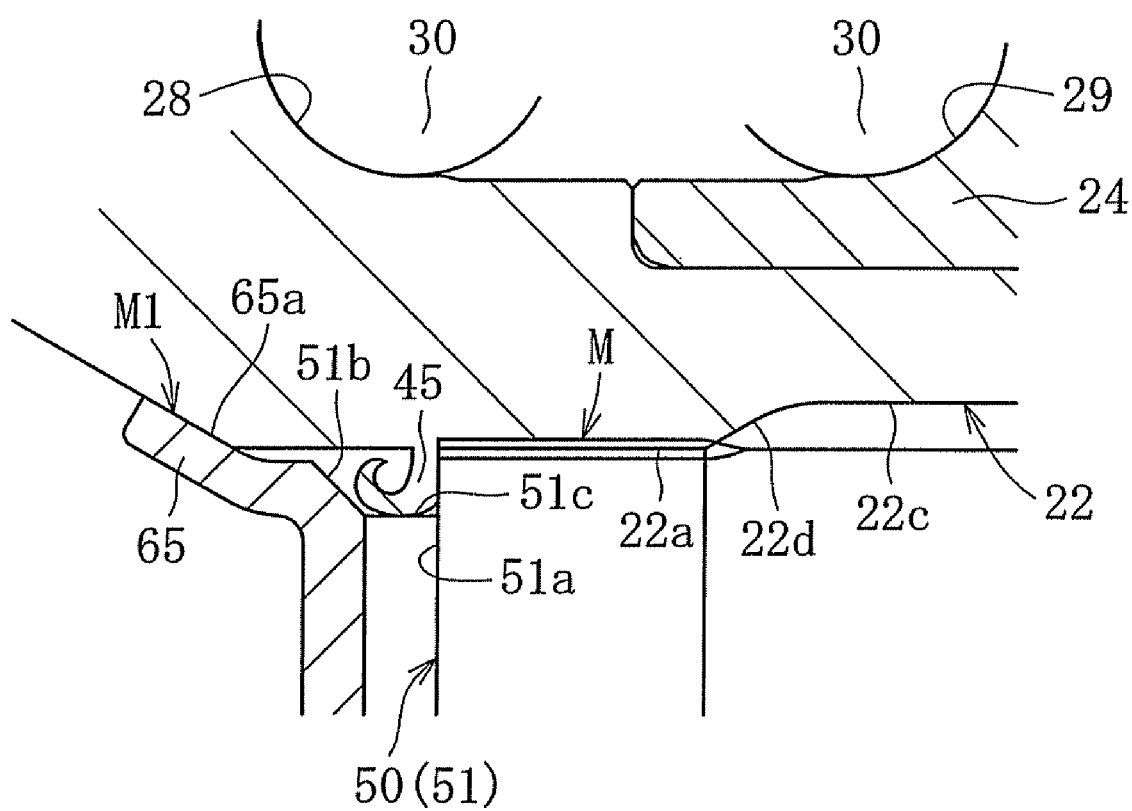
FIG. 15 is a main-parts enlarged cross sectional view of the bearing device for the wheel in FIG. 14.

The pocket portion 50 is formed by providing a circumferential groove 51 at a shaft end edge of the spline 41 of the shaft portion 12. As shown in FIG. 15, the circumferential groove 51 is structured such that a side surface 51a on the spline 41 side is constructed by a flat surface orthogonal to the axial direction, and a side surface 51b on the opposite spline side is constructed by a taper surface expanded toward the opposite spline side from a groove bottom 51c. Further, a taper-shaped locking piece 65 constructing the shaft portion come-off preventing structure M1 is formed farther on the opposite spline side than the side surface 51b.

Figure 16:
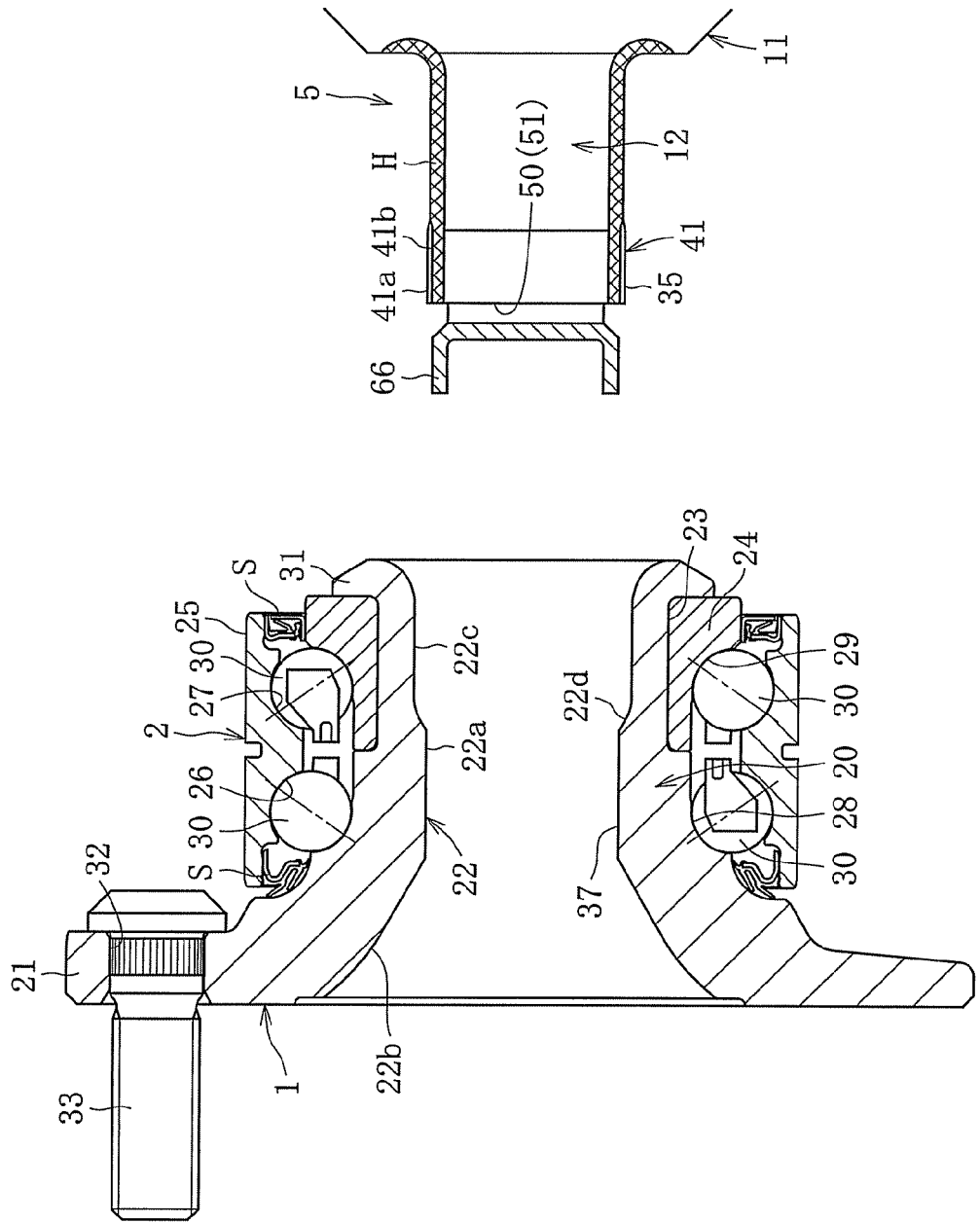
FIG. 16 is a cross sectional view showing before assembling the bearing device for the wheel in FIG. 14.

As shown in FIG. 16, if the shaft portion 12 is press-fitted to the hole portion 22 of the hub wheel 1 in a state in which the axis of the hub wheel 1 is aligned with the axis of the outer joint member 5 of the constant velocity universal joint 3, the formed protruding portion 45 is stored within the pocket portion 50 in a curling manner. In other words, a part of the material which is chipped away or pushed out from the inner surface of the hole portion 22 enters into the pocket portion 50.

As described above, it is possible to hold (maintain) the protruding portion 45 within the pocket portion 50 by providing the pocket portion 50 storing the protruding portion 45 generated by forming the concave portion during the press-fit, and it is possible to prevent the protruding portion 45 from entering into the vehicle outside the device. In other words, it is possible to keep the protruding portion 45 being stored in the pocket portion 50, which eliminates the need for the removal processing of the protruding portion 45 and thus reduces the number of assembly work steps, resulting in improved assembling workability and a reduction in cost.

Further, since the short cylinder portion 66 is in a state of being protruded into the taper hole 22b, after the press-fit is finished, it is necessary to expand the short cylinder portion 66 in diameter. Accordingly, it is possible to enlarge the diameter by using the jig 67 shown in FIG. 4, and if the short cylinder portion 66 is expanded in diameter, the shaft portion come-off preventing structure M1 is formed.

Figure 17:
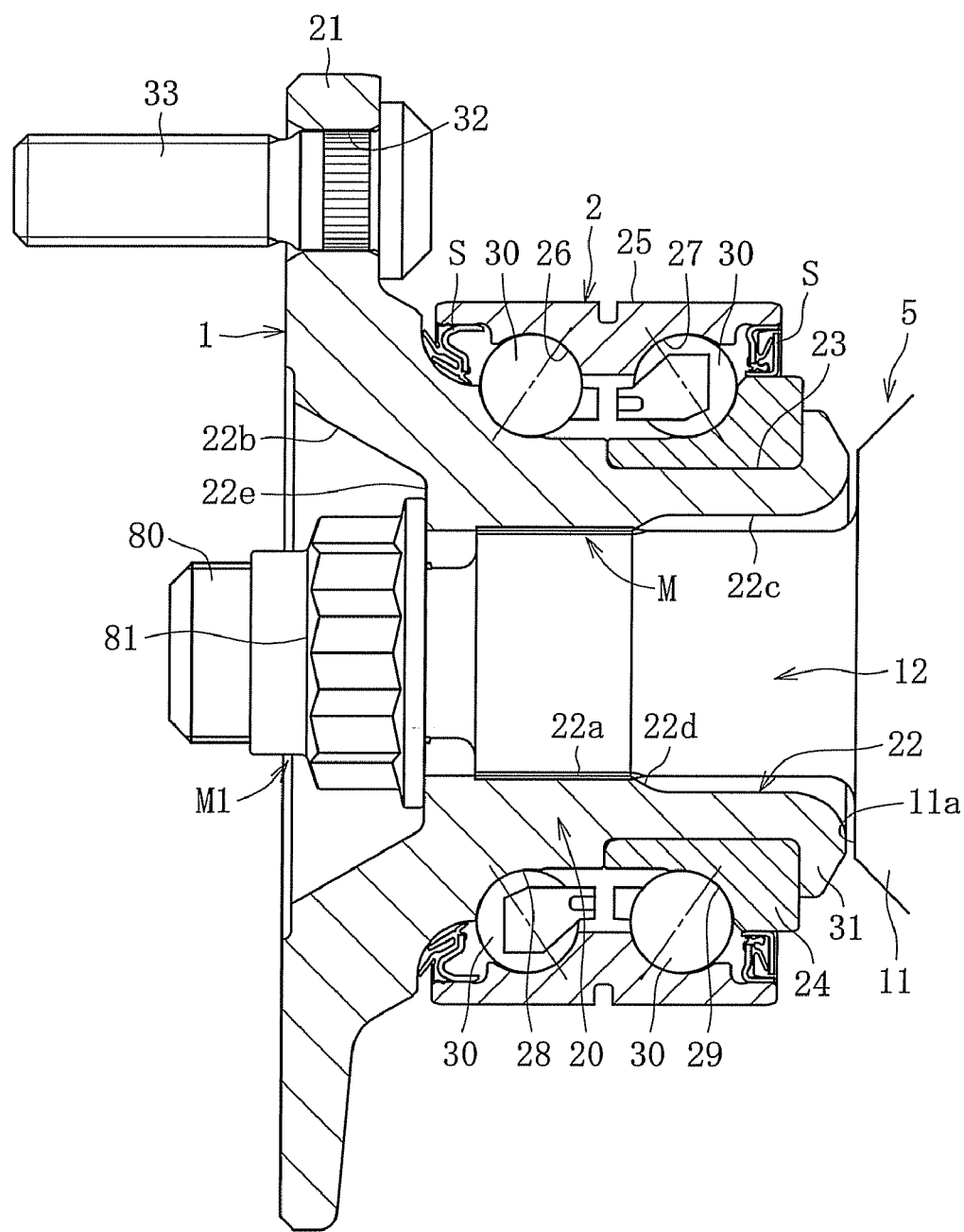
FIG. 17 is a main-parts cross sectional view of a bearing device for a wheel and shows a fifth embodiment in accordance with the present invention.
Figure 18:
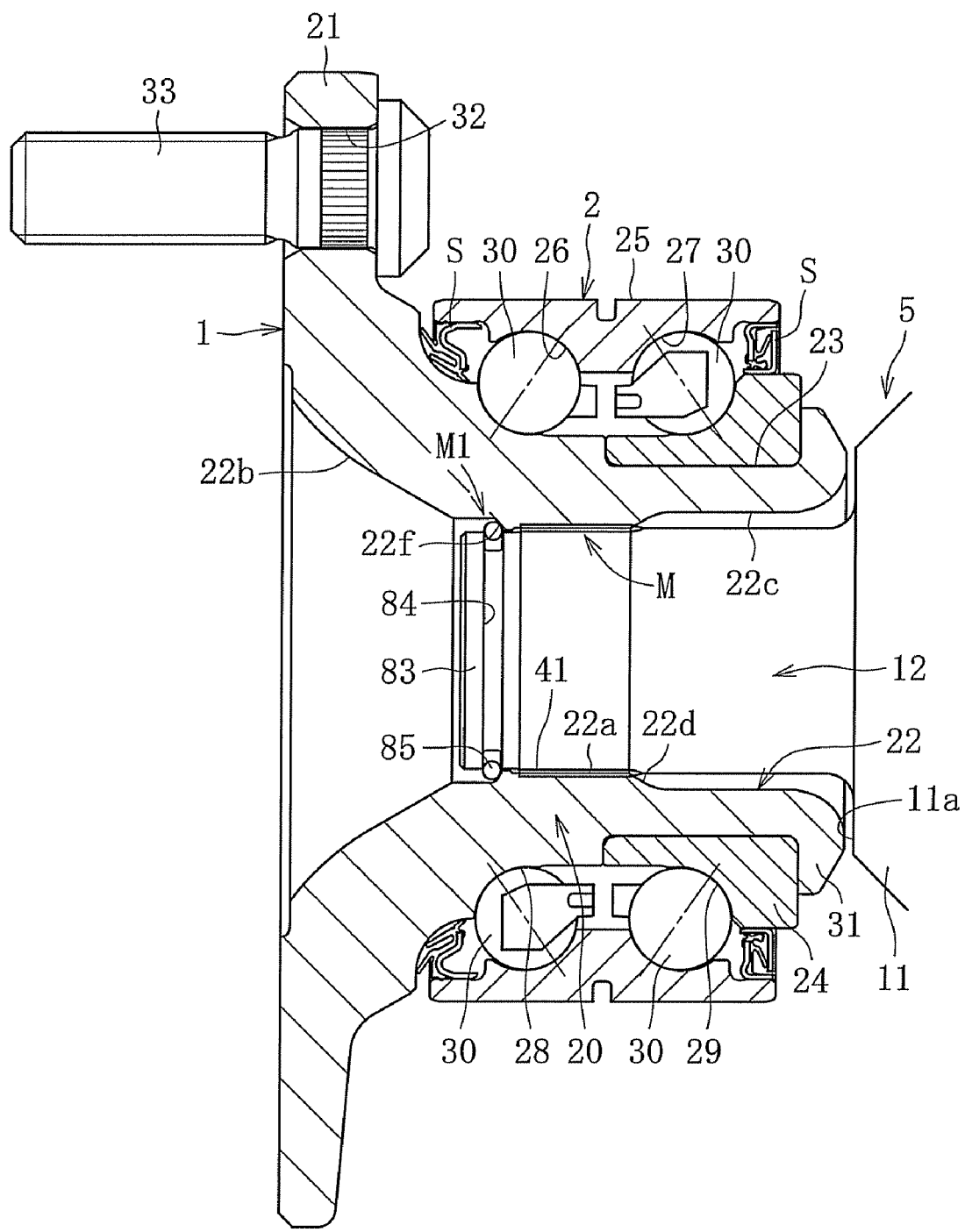
FIG. 18 is a main-parts cross sectional view of a bearing device for a wheel and shows a sixth embodiment in accordance with the present invention.
Figure 19:
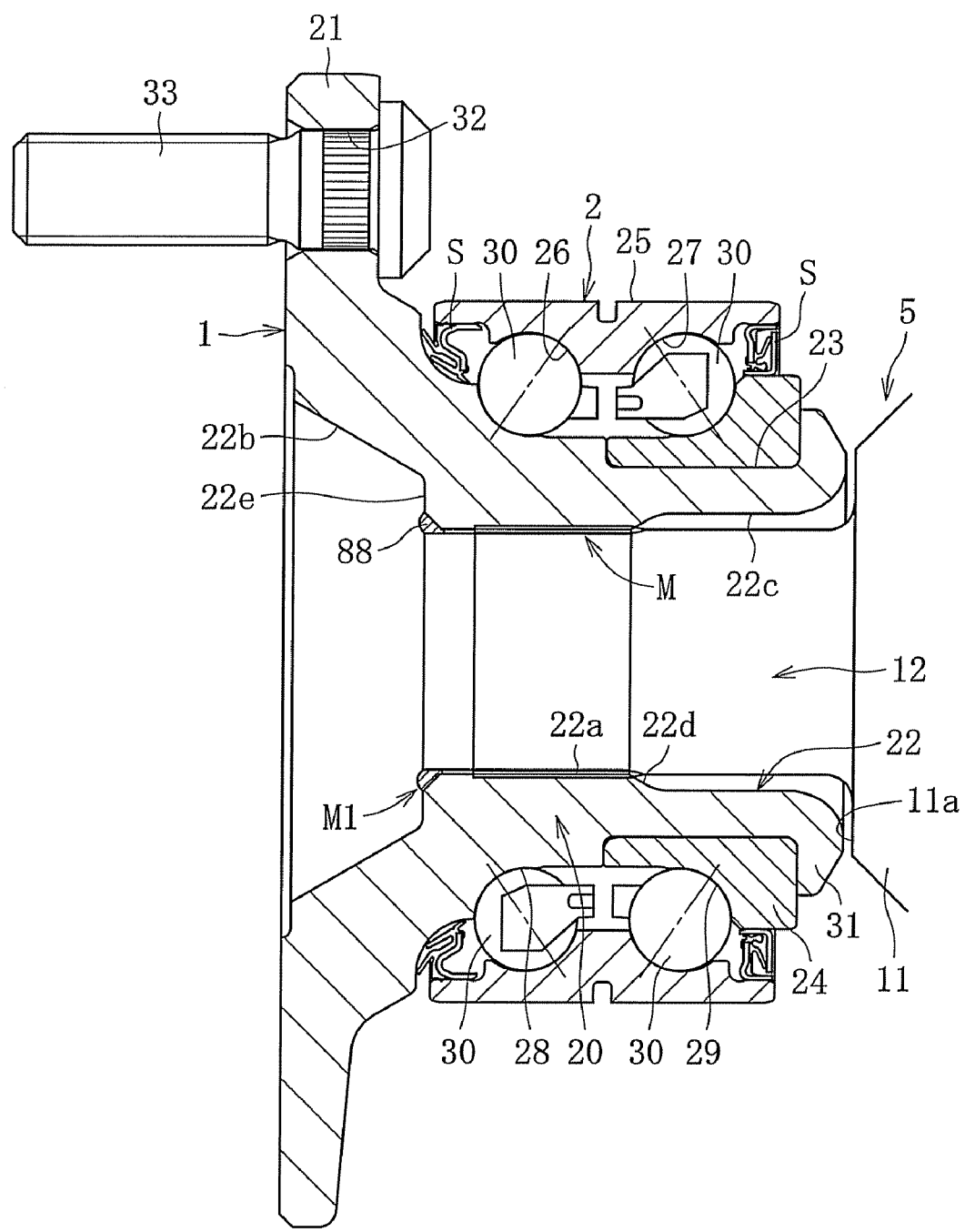
FIG. 19 is a main-parts cross sectional view of a bearing device for a wheel and shows a seventh embodiment in accordance with the present invention.

As the shaft portion come-off preventing structure M1, any connecting means may be used including a bolt nut connection as shown in FIG. 17 in a fifth embodiment, a stop ring as shown in FIG. 18 in a sixth embodiment, and welding or the like as shown in FIG. 19 in a seventh embodiment.

In FIG. 17, a thread shaft portion 80 is continuously provided on the shaft portion 12, and a nut member 81 is screwed to the thread shaft portion 80. Further, the nut member 81 is brought into contact with the step surface 22e of the hole portion 22. Accordingly, the coming-off of the shaft portion 12 from the hole portion 22 of the hub wheel 1 to the shaft side is regulated.

In FIG. 18, a shaft extension portion 83 is provided farther on the opposite joint side than the spline 41, a circumferential groove 84 is provided on the shaft extension portion 83, and a stop ring 85 is fitted and attached to the circumferential groove 84. Further, on the hole portion 22 of the hub wheel 1 at the shaft portion 12, a step portion 22f to which the stop ring 85 is locked is provided between the fitting hole 22a and the taper hole 22b. Accordingly, the stop ring 85 locks to the step portion 22f so as to regulate the come-off of the shaft portion 12 from the hole portion 22 of the hub wheel 1 to the shaft side.

In FIG. 19, an outer circumferential surface of the end portion of the shaft portion 12 is bonded to an end edge portion of an opening portion on the stepped surface 22e side of the fitting hole 22a by means of welding. This regulates the come-off of the shaft portion 12 from the hole portion 22 of the hub wheel 1 to the shaft side. In this case, a weld position 88 may be arranged on the entire circumference or may be arranged at a predetermined pitch along the circumferential direction.

Figure 20A:
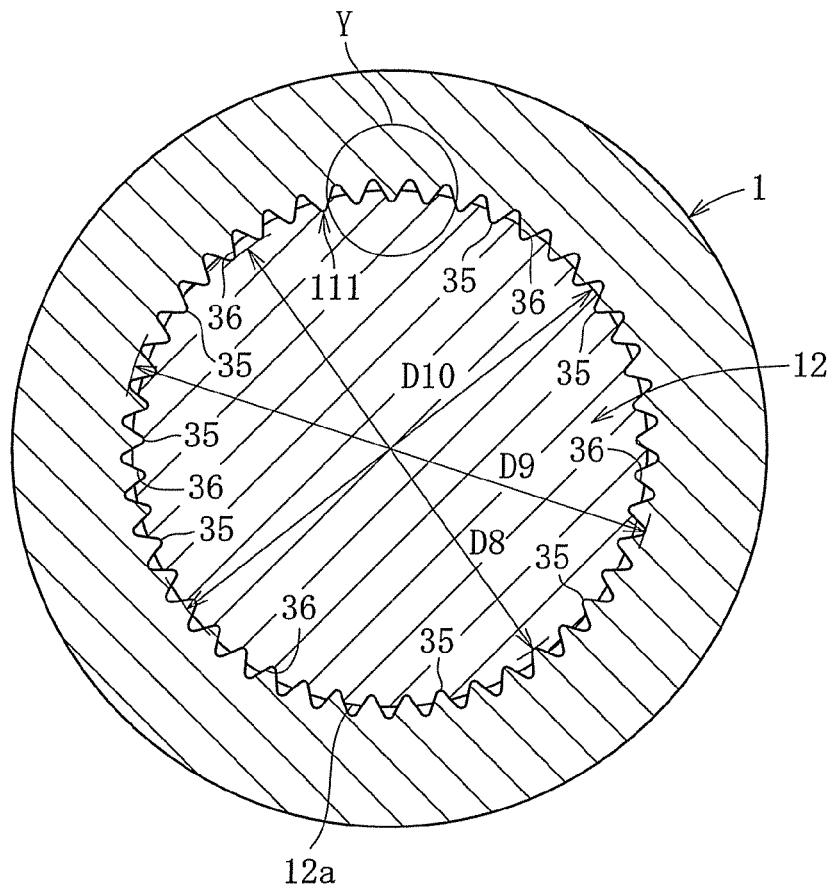
FIG. 20A is a horizontal cross sectional view showing another concave and convex fitting structure of the bearing device for the wheel.
Figure 20B:
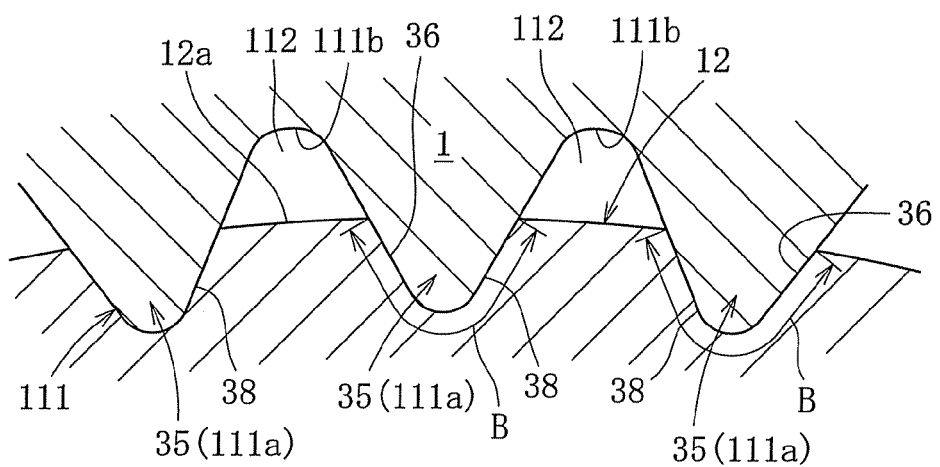
FIG. 20B is an enlarged view of a portion Y in FIG. 20A.
Figure 21:
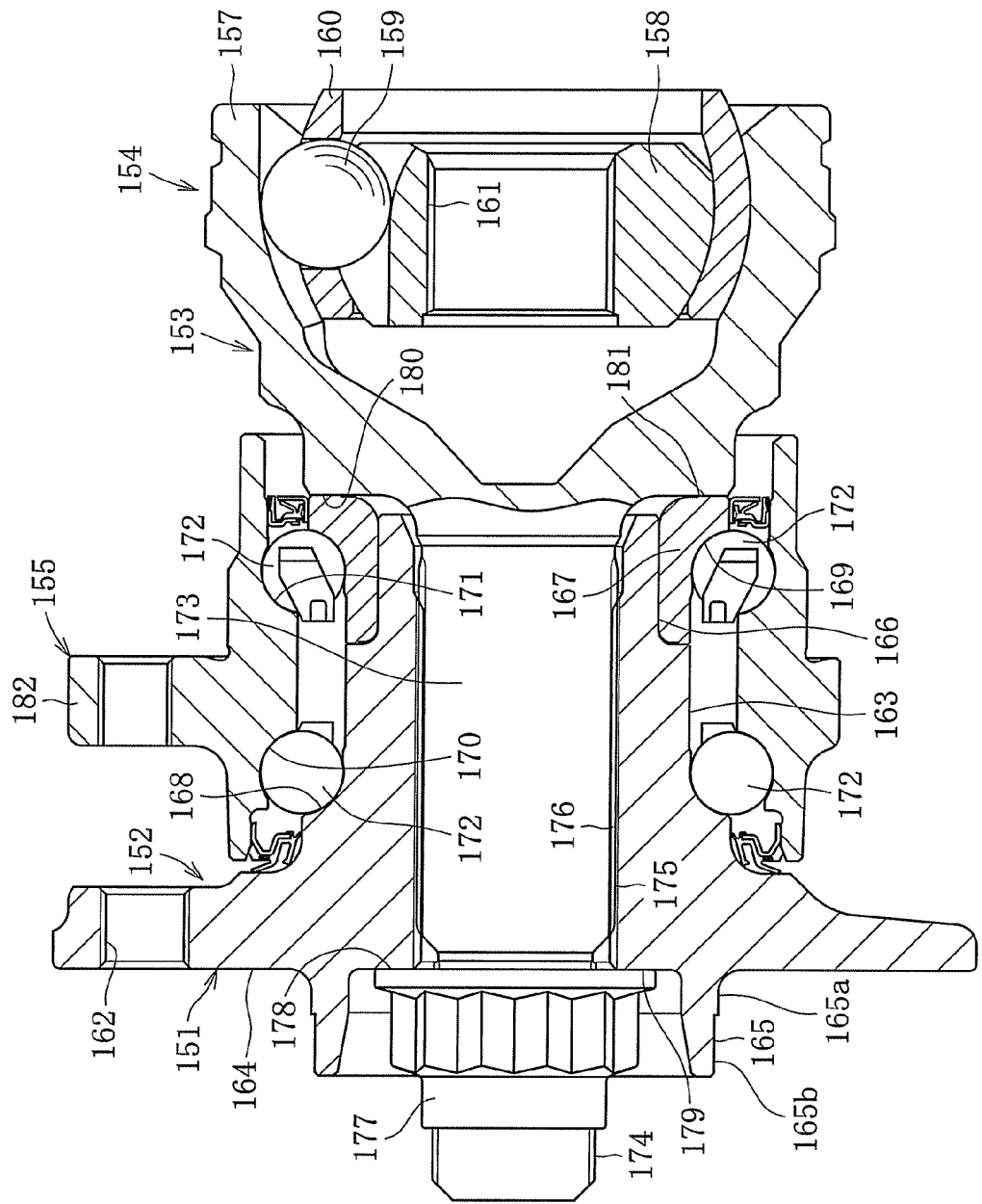
FIG. 21 is a cross sectional view of a conventional bearing device for a wheel.

Incidentally, in each of the embodiments mentioned above, the spline 41 constructing the convex portion (the convex portion protruding to the inner side in the radial direction) 35 is formed in the shaft portion 12 side, the hardening treatment is applied to the spline 41 of the shaft portion 12, and the inner surface of the hub wheel 1 is unhardened (green material). On the contrary, as shown in FIGS. 20A and 20B, a spline 111 (constructed by a convex rim 111a and a concave rim 111b) to which hardening treatment is applied may be formed on the inner surface of the hole portion 22 of the hub wheel 1, and the hardening treatment may not be applied to the shaft portion 12. In this case, the spline 111 may be formed by various known working methods such as broaching, cutting, pressing, and drawing. Further, as the thermal hardening treatment, it is possible to employ various kinds of heat treatment such as high-frequency quenching, and carburizing and quenching.

In this case, an intermediate position in a protruding direction of the convex portion 35 corresponds to a position of a concave portion forming surface (an outer surface of the shaft portion 12) before formation of the concave portion. In other words, a diameter dimension (a maximum diameter dimension of the convex portion 35) D8 of a circular arc connecting apexes of the convex portions 35 corresponding to the convex rims 111a of the spline 111 is set to be smaller than an outer diameter dimension D10 of the shaft portion 12, and a diameter dimension D9 of a circular arc connecting bottoms of the concave rims 111b of the spline 111 (roots between adjacent convex portions in the circumferential direction) is set to be larger than an outer diameter dimension D10 of the shaft portion 12. In other words, a relationship D8<D10<D9 is established.

If the shaft portion 12 is press-fitted to the hole portion 22 of the hub wheel 1, it is possible to form the concave portion 36 to which the convex portion 25 is fitted on the outer circumferential surface of the shaft portion 12 by the convex portion 35 on the hub wheel 1 side. Accordingly, the entire fitting contact position 38 between the convex portion 35 and the concave portion fitted thereto is an intimately attached state.

In this case, the fitting contact position 38 is a range B shown in FIG. 20B and ranges from a middle portion of the chevron in the cross section of the convex portion 35 to the peak. Further, a gap 112 is formed farther on the outer diameter side than the outer circumferential surface of the shaft portion 12 between adjacent convex portions 35 in the circumferential direction.

Even in the case shown in FIG. 20, since the protruding portion 45 is formed by the press-fit, it is preferable to provide a storage portion storing the protruding portion 45. Since the protruding portion 45 is formed on the mouth side, the storage portion is provided on the hub wheel 1 side.

In the case of such press-fit that the convex portion 35 of the concave and convex fitting structure M is provided on the inner surface 37 of the hole portion 22 of the hub wheel 1 while the hardness of the end portion in the axial direction of the convex portion 35 higher than the outer diameter portion of the shaft portion 12 of the outer joint member 5, it is not necessary to carry out the hardness treatment (the heat treatment) on the shaft portion side, and thus the outer joint member (the outer joint member 5) of the constant velocity universal joint is excellent in productivity.

The description has been given of the embodiments in accordance with the present invention; however, the present invention can be variously modified without being limited to the embodiments mentioned above. For example, the shape of the convex portion 35 of the concave and convex fitting structure M is a triangular shape in the cross section in the embodiment shown in FIG. 2, and a trapezoidal shape (the shape of Mt. Fuji) in the cross section in the embodiment shown in FIG. 6; however, various shapes other than the above may be employed such as a semicircular shape, a semi-oval shape, and a rectangular shape. Also, the area, number, circumferential arranged pitch, and the like of the convex portion 35 may be optionally changed. In other words, the convex portion 35 of the concave and convex fitting structure M may not necessarily be the convex rims 41a and 111a of the splines 41 and 111 formed with splines 41 and 111; keys or similar material may be employed, or a curved wavy shaped mating surface may be formed. In short, any structure may be employed insofar as the convex portion 35 arranged in the axial direction is press-fitted to the other side, the concave portion 36 intimately attached and fitted to the convex portion 35 can be formed on the other side by the convex portion 35, the entire fitting contact position 38 between the convex portion 35 and the concave portion 36 fitted thereto is in an intimately attached state, and rotational torque can be transmitted between the hub wheel 1 and the constant velocity universal joint 3.

Further, as the hole portion 22 of the hub wheel 1, a different form hole from the circular hole may be employed such as a polygonal hole, and the cross sectional shape of the end portion of the shaft portion 12 fitted and inserted to the hole portion 22 may have a different form cross section from the circular cross section such as a polygonal cross section. Further, at a time of press-fitting the shaft portion 12 to the hub wheel 1, since only the press-fit start end portion of the convex portion 35 needs to have a higher hardness than the position in which the concave portion 36 is formed, it is not necessary to make the hardness of the entire convex portion 35 higher. The gap 40 is formed in FIG. 2 or the like; however, the convex portion 35 cut into the inner surface 37 of the hub wheel 1 as far as the root between the convex portions 35. The hardness difference between the convex portion 35 side and the concave portion forming surface side formed by the convex portion 35 is preferably equal to or more than 30 points by HRC, as described above; however, a hardness difference less than 30 points may be employed insofar as the convex portion 35 can be press-fitted.

The end surface (the press-fit start end) of the convex portion 35 is orthogonal to the axial direction in the embodiment mentioned above; however, the surface may be inclined at a predetermined angle with respect to the axial direction. In this case, the surface may be inclined to the opposite convex portion side from the inner diameter side toward the outer diameter side or may be inclined to the convex portion side.

Further, as the shape of the pocket portion 50, the circumferential groove 51 is formed as a taper surface in which the side surface 51b on the opposite spline side is expanded in diameter from the groove bottom 51c toward the opposite spline side in the embodiment mentioned above; however, the taper surface is not necessarily be formed. In short, any structure can be employed insofar as it can accommodate (store) the generated protruding portion 45, and accordingly any pocket portion can be employed that has a volume that corresponds to the generated protruding portion 45.

Further, small concave portions arranged at a predetermined pitch along the circumferential direction may be provided on the inner surface 37 of the hole portion 22 of the hub wheel 1. As the small concave portion, it is necessary to make it smaller than the volume of the concave portion 36. It is possible to achieve an improvement of the press-fitting characteristic of the convex portion 35 by providing the above-described small concave portions. In other words, providing the small concave portions makes it possible to reduce the volume of the protruding portion 45 formed at a time of press-fitting the convex portion 35, resulting in reduced press-fit resistance. Further, since the protruding portion 45 can be reduced in size, it is possible to make the volume of the pocket portion 50 small, and it is possible to achieve an improvement of workability of the pocket portion 50 and strength of the shaft portion 12. The shape of the small concave portion can employ various shapes such as a triangular shape, a semi-oval shape, and a rectangular shape, and the number of the small concave portions can be set in any manner.

As a coupling means shown in FIG. 19, the coupling means of welding is used; however, an adhesive agent may be used in place of the welding. Further, as the rolling element 30 of the bearing 2, a roller may be used. Further, in the embodiment mentioned above, the third generation of bearing device for the wheel is shown; however, the first generation, the second generation, or the fourth generation may be employed. When press-fitting the convex portion 35, the side in which the convex portion 35 is formed may be moved while fixing the side in which the concave portion 36 is formed; inversely, the side in which the concave portion 36 is formed may be moved while fixing the side in which the convex portion 35 is formed; or both the sides may be moved. In the constant velocity universal joint 3, the inner joint member 6 and the shaft 10 may be integrated via the concave and convex fitting structure M described in each of the embodiments.

When using the stop ring 85 or the like as shown in FIG. 18 in the shaft portion come-off preventing structure M1, for example, the shaft portion come-off preventing structure M1 may be provided on the root portion side (the mouth side) of the shaft portion 12, instead of providing the structure M1 on the end portion of the shaft portion 12.

INDUSTRIAL APPLICABILITY

The present invention can be applied to bearing devices for a wheel of the first generation structured such that the double row roller bearing is singly used; of the second generation integrally having a vehicle body attaching flange on the outer member; of the third generation in which one inner raceway surface of the double row roller bearing is integrally formed on the outer circumference of the hub wheel integrally having the wheel attaching flange; and of the fourth generation in which the constant velocity universal joint is integrated in the hub wheel while the other inner raceway track of the double row roller bearing is integrally formed on the outer circumference of the outer joint member constructing the constant velocity universal joint.

What is claimed is:

1. A bearing device for a wheel, comprising:
a roller bearing having an outer member having on an inner circumference thereof double row raceway surfaces;
an inner member having on an outer circumference thereof double row raceway surfaces; and
double row rolling elements interposed between the raceway surfaces of the outer member and the raceway surfaces of the inner member,
wherein the inner member comprising on an outer surface thereof a hub wheel having a wheel attaching flange, the hub wheel being integrated with, via a convex and concave fitting structure, a shaft portion of an outer joint member of a constant velocity universal joint fitted and inserted to a hole portion of the hub wheel,
wherein a convex portion extending in an axial direction and provided on one of an outer diameter surface of the shaft portion of the outer joint member of the constant velocity universal joint and an inner diameter surface of the hole portion of the hub wheel is press-fitted to another of the outer diameter surface of the shaft portion of the outer joint member of the constant velocity universal joint and the inner diameter surface of the hole portion of the hub wheel along the axial direction, and a concave portion intimately attached and fitted to the convex portion is formed on the other of the outer diameter surface of the shaft portion of the outer joint member of the constant velocity universal joint and the inner diameter surface of the hole portion of the hub wheel by the convex portion, thereby configuring the convex and concave fitting structure where an entire area of fitting and contact between the convex portion and the concave portion is in an intimate contact state, while providing a shaft portion come-off preventing structure between the shaft portion of the outer joint member and an inner surface of the hub wheel.

2. The bearing device for a wheel according to claim 1, wherein the concave portion intimately attached and fitted to the convex portion is formed on the inner diameter surface of the hole portion of the hub wheel by the convex portion by providing the convex portion of the concave and convex fitting structure on the outer diameter surface of the shaft portion of the outer joint member, making a hardness of at least an end portion in the axial direction of the convex portion higher than an inner diameter portion of the hole portion of the hub wheel, and press-fitting the shaft portion to the hole portion of the hub wheel from an end portion side in the axial direction of the convex portion, thereby configuring the concave and convex fitting structure.

3. The bearing device for a wheel according to claim 2, wherein the hole portion of the hub wheel is provided with a shaft portion fitting hole in which the concave and convex fitting structure is formed, and a taper hole which is expanded from an end portion in an opposite joint side of the shaft portion fitting hole of the shaft portion toward the opposite joint side, and the shaft portion come-off preventing structure is constructed by a taper-shaped locking piece which extends from the shaft portion of the outer joint member and locks to the taper hole.

4. The bearing device for a wheel according to claim 2, wherein the hole portion of the hub wheel is provided with a shaft portion fitting hole in which the concave and convex fitting structure is formed, and a stepped surface which extends to an outer diameter side from an end portion in an opposite joint side of the shaft portion fitting hole, and the shaft portion come-off preventing structure is constructed by an outer collar-shaped locking piece which extends in an outer diameter direction from the shaft portion of the outer joint member and locks to the stepped surface.

5. The bearing device for a wheel according to claim 2, wherein an inner diameter dimension of the inner diameter surface of the hole portion of the hub wheel is set smaller than a maximum diameter dimension of a circular arc connecting apexes of a plurality of the convex portions provided on the shaft portion of the outer joint member, and larger than a maximum diameter dimension of a circular arc connecting roots between the convex portions of the shaft portion.

6. The bearing device for a wheel according to claim 5, wherein the hole portion of the hub wheel is provided with a shaft portion fitting hole in which the concave and convex fitting structure is formed, and a taper hole which is expanded from an end portion in an opposite joint side of the shaft portion fitting hole of the shaft portion toward the opposite joint side, and the shaft portion come-off preventing structure is constructed by a taper-shaped locking piece which extends from the shaft portion of the outer joint member and locks to the taper hole.

7. The bearing device for a wheel according to claim 5, wherein the hole portion of the hub wheel is provided with a shaft portion fitting hole in which the concave and convex fitting structure is formed, and a stepped surface which extends to an outer diameter side from an end portion in an opposite joint side of the shaft portion fitting hole, and the shaft portion come-off preventing structure is constructed by an outer collar-shaped locking piece which extends in an outer diameter direction from the shaft portion of the outer joint member and locks to the stepped surface.

8. The bearing device for a wheel as claimed in claim 1, wherein the concave portion intimately attached and fitted to the convex portion is formed on the outer diameter surface of the shaft portion of the outer joint member by the convex portion by providing the convex portion of the concave and convex fitting structure on the inner diameter surface of the hole portion of the hub wheel, making a hardness of at least an end portion in the axial direction of the convex portion higher than an outer diameter portion of the shaft portion of the outer joint member of the constant velocity universal joint, and press-fitting the convex portion at the hub wheel to the shaft portion of the outer joint member from an end portion side in the axial direction, thereby configuring the concave and convex fitting structure.

9. The bearing device for a wheel according to claim 8, wherein an outer diameter dimension of the shaft portion of the outer joint member is set larger than a minimum diameter dimension of a circular arc connecting apexes of a plurality of the convex portions provided on the hole portion of the hub wheel and protruding inward in a radial direction, and smaller than a minimum diameter dimension of a circular arc connecting roots between the convex portions of the hole portion of the hub wheel.

10. The bearing device for a wheel according to claim 9, wherein the hole portion of the hub wheel is provided with a shaft portion fitting hole in which the concave and convex fitting structure is formed, and a taper hole which is expanded from an end portion in an opposite joint side of the shaft portion fitting hole of the shaft portion toward the opposite joint side, and the shaft portion come-off preventing structure is constructed by a taper-shaped locking piece which extends from the shaft portion of the outer joint member and locks to the taper hole.

11. The bearing device for a wheel according to claim 8, wherein the hole portion of the hub wheel is provided with a shaft portion fitting hole in which the concave and convex fitting structure is formed, and a taper hole which is expanded from an end portion in an opposite joint side of the shaft portion fitting hole of the shaft portion toward the opposite joint side, and the shaft portion come-off preventing structure is constructed by a taper-shaped locking piece which extends from the shaft portion of the outer joint member and locks to the taper hole.

12. The bearing device for a wheel according to claim 1, wherein the hole portion of the hub wheel is provided with a shaft portion fitting hole in which the concave and convex fitting structure is formed, and a taper hole which is expanded from an end portion in an opposite joint side of the shaft portion fitting hole of the shaft portion toward the opposite joint side, and the shaft portion come-off preventing structure is constructed by a taper-shaped locking piece which extends from the shaft portion of the outer joint member and locks to the taper hole.

13. The bearing device for a wheel according to claim 12, wherein the taper-shaped locking piece is constructed by expanding a part of the shaft portion of the outer joint member in a state in which the press-fit of the shaft portion of the outer joint member to the hole portion of the hub wheel is finished.

14. The bearing device for a wheel according to claim 12, wherein the taper-shaped locking piece is constructed by expanding a short cylinder portion for aligning provided in the end portion of the shaft portion of the outer joint member.

15. The bearing device for a wheel according to claim 1, wherein the hole portion of the hub wheel is provided with a shaft portion fitting hole in which the concave and convex fitting structure is formed, and a stepped surface which extends to an outer diameter side from an end portion in an opposite joint side of the shaft portion fitting hole, and the shaft portion come-off preventing structure is constructed by an outer collar-shaped locking piece which extends in an outer diameter direction from the shaft portion of the outer joint member and locks to the stepped surface.

16. The bearing device for a wheel according to claim 15, wherein the outer collar-shaped locking piece is constructed by being caulked in such a manner that a part of the shaft portion of the outer joint member protrudes to the outer diameter side in a state in which the press-fit of the shaft portion of the outer joint member to the hole portion of the hub wheel is finished.

17. The bearing device for a wheel according to claim 1, wherein the bearing device is provided with a pocket portion storing a protruding portion which is generated by forming the concave portion of the hole portion of the hub wheel during the press-fit.

18. The bearing device for a wheel according to claim 1, wherein any position in a protruding direction of the convex portion extending in the axial direction and provided on the one of the outer diameter surface of the shaft portion of the outer joint member of the constant velocity universal joint and the inner diameter surface of the hole portion of the hub wheel corresponds to a position of a concave portion forming surface of the other of the outer diameter surface of the shaft portion of the outer joint member of the constant velocity universal joint and the inner diameter surface of the hole portion of the hub wheel before formation of the concave portion.

19. The bearing device for a wheel according to claim 18, wherein a total of thicknesses in a circumferential direction of intermediate positions in the protruding direction of convex portions is made smaller than a total of thicknesses in the circumferential direction at positions corresponding to the intermediate positions at peak portions on another side fitted between the adjacent convex portions in the circumferential direction.

20. The bearing device for a wheel according to claim 1, wherein a thickness in a circumferential direction of an intermediate position in a protruding direction of the convex portion is made smaller than a dimension in a circumferential direction at a position corresponding to the intermediate position in the protruding direction between adjacent convex portions in the circumferential direction.

* * * * *